(12) United States Patent
Li

(10) Patent No.: US 10,129,320 B2
(45) Date of Patent: Nov. 13, 2018

(54) QOS IMPROVEMENT METHOD, APPARATUS, AND SYSTEM

(71) Applicant: Huawei Technologies Co., Ltd., Shenzhen (CN)

(72) Inventor: Dong Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 15/176,844

(22) Filed: Jun. 8, 2016

(65) Prior Publication Data
US 2016/0285946 A1   Sep. 29, 2016

Related U.S. Application Data

(63) Continuation of application No. PCT/CN2013/089179, filed on Dec. 12, 2013.

(51) Int. Cl.
| | |
|---|---|
| H04L 29/06 | (2006.01) |
| H04L 29/08 | (2006.01) |
| H04L 12/24 | (2006.01) |
| H04L 12/14 | (2006.01) |
| H04L 29/12 | (2006.01) |

(52) U.S. Cl.
CPC .......... *H04L 65/80* (2013.01); *H04L 12/1407* (2013.01); *H04L 29/08072* (2013.01); *H04L 41/00* (2013.01); *H04L 41/5003* (2013.01); *H04L 61/2007* (2013.01); *H04L 65/1016* (2013.01); *H04L 65/1069* (2013.01); *H04L 65/608* (2013.01); *H04L 67/02* (2013.01)

(58) Field of Classification Search
CPC .......................... H04L 29/08072; H04L 29/06
USPC .................. 709/203, 220, 224, 228; 370/352
See application file for complete search history.

(56) References Cited

U.S. PATENT DOCUMENTS

| | | | |
|---|---|---|---|
| 7,826,361 B2 * | 11/2010 | Ejiri | H04L 47/14 370/231 |
| 9,282,046 B1 * | 3/2016 | Dropps | H04L 47/21 |
| 9,338,090 B2 * | 5/2016 | Sonoda | H04L 45/308 |
| 9,668,160 B2 * | 5/2017 | Wilkinson | H04L 41/12 |

(Continued)

FOREIGN PATENT DOCUMENTS

| | | |
|---|---|---|
| CN | 101009631 A | 8/2007 |
| CN | 102904930 A | 1/2013 |

(Continued)

OTHER PUBLICATIONS

Alcatel-Lucent, "3GPP IMS WebRTC WID Overview," Nov. 12, 2012, 11 pages.

(Continued)

*Primary Examiner* — Khanh Q Dinh
(74) *Attorney, Agent, or Firm* — Slater Matsil, LLP

(57) ABSTRACT

The present invention discloses a quality of service QoS improvement method, apparatus, and system. The method includes: acquiring, by a web real-time communication WebRtc server and/or a QoS decision network element, IP addresses and service port numbers of both parties of user equipments that perform audio and video communication; and forming, by the QoS decision network element, a parameter according to the IP addresses and the service port numbers of the both parties of the user equipments, and sending a QoS improvement request to a policy and charging control entity PCRF.

12 Claims, 9 Drawing Sheets

A WebRtc server acquires an IP address and a service port number of user equipment A, and an IP address and a service port number of user equipment B — 201

The WebRtc server sends the IP address and the service port number of the user equipment A, and the IP address and the service port number of the user equipment B to a QoS decision network element, so that the QoS decision network element forms a parameter according to the IP address and the service port number of the user equipment A, and the IP address and the service port number of the user equipment B, and sends a QoS improvement request to a PCRF — 202

(56) References Cited

U.S. PATENT DOCUMENTS

| | | | |
|---|---|---|---|
| 9,917,849 B2* | 3/2018 | Bitton | H04L 63/1408 |
| 2014/0164633 A1* | 6/2014 | Bi | H04L 67/14 |
| | | | 709/227 |
| 2014/0219167 A1* | 8/2014 | Santhanam | H04W 28/0268 |
| | | | 370/328 |
| 2014/0331274 A1* | 11/2014 | Bitton | H04L 63/1408 |
| | | | 726/1 |
| 2015/0249668 A1* | 9/2015 | Reddy | H04L 47/10 |
| | | | 726/4 |
| 2015/0271100 A1 | 9/2015 | Huang et al. | |
| 2015/0350723 A1 | 12/2015 | He | |
| 2015/0382384 A1* | 12/2015 | Baek | H04W 48/08 |
| | | | 370/329 |

FOREIGN PATENT DOCUMENTS

| | | |
|---|---|---|
| CN | 103037449 A | 4/2013 |
| CN | 103404132 A | 11/2013 |
| EP | 2897343 A1 | 7/2015 |

OTHER PUBLICATIONS

Reddy, T., et al., "Considerations with WebRTC in Mobile Networks," RTCWEB Internet-Draft, May 9, 2013, 16 pages.

* cited by examiner

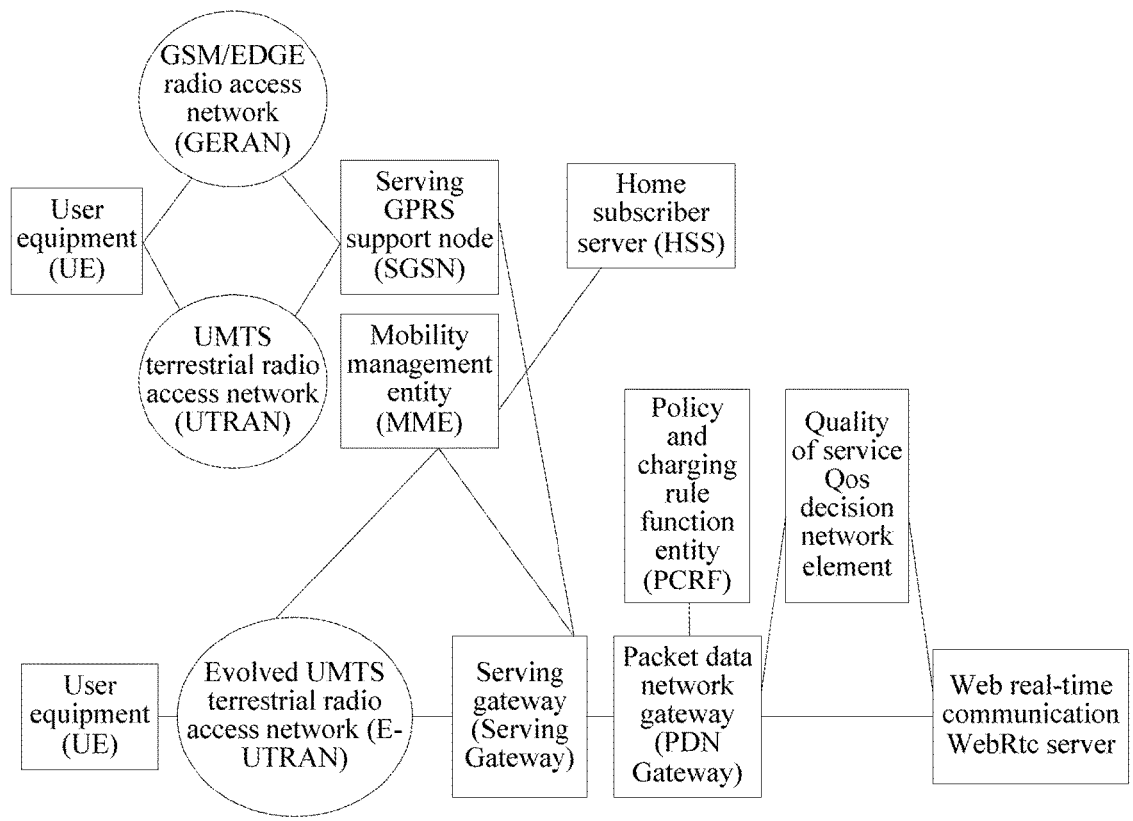

FIG. 1

A WebRtc server acquires an IP address and a service port number of user equipment A, and an IP address and a service port number of user equipment B    / 201

The WebRtc server sends the IP address and the service port number of the user equipment A, and the IP address and the service port number of the user equipment B to a QoS decision network element, so that the QoS decision network element forms a parameter according to the IP address and the service port number of the user equipment A, and the IP address and the service port number of the user equipment B, and sends a QoS improvement request to a PCRF    / 202

FIG. 2

| User equipment A | User equipment B | WebRtc server | QoS decision network element | Policy and charging rule function entity (PCRF) |

501. Register

502. Log in

503. Log in

504. Send call request signaling

505. Send an IP address and a service port number of the user equipment A

506. Send the call request signaling

507. Send answer signaling

508. Send an IP address and a service port number of the user equipment B

Send the IP address and the service port number of the user equipment A, and the IP address and the service port number of the user equipment B 509. Send the answer signaling 510. Send a service acceleration request 511. Perform QoS improvement on the user equipment A 512. Perform QoS improvement on the user equipment B 513. Complete QoS improvement

FIG. 5

QOS IMPROVEMENT METHOD, APPARATUS, AND SYSTEM

CROSS-REFERENCE TO RELATED APPLICATIONS

This application is a continuation of International Application No. PCT/CN2013/089179 filed on Dec. 12, 2013, which is incorporated herein by references in its entirety.

TECHNICAL FIELD

The present invention relates to the communications field, and in particular, to a QoS improvement method, apparatus, and system.

BACKGROUND

With rapid development of Internet technologies, various new technologies and new services continuously appear, and a web (Web) technological change led by a hypertext markup language 5 (HTML5) technology gradually becomes a main service formation of the Internet. A web real-time communication (WebRTC) is a technology of performing real-time video and audio communication inside a browser, and the technology is based on a Web Hypertext Application Technology Working Group (WHATWG) protocol, to achieve a real-time communication (RTC) capability by providing a simple Java description language by using a browser. An ultimate objective of a WebRTC project is mainly to enable a Web developer to easily and quickly develop, based on a browser, abundant real-time multimedia applications, and the Web developer does not need to download or install any plug-in. The Web developer does not need to focus on a digital signal processing process of multimedia either, but only needs to write a simple Java language program. In addition, it is further intended that in the WebRTC project, a real-time communication platform can be established among multiple Internet browsers, to form a desirable ecosystem between a developer and a browser vendor.

Currently, each WebRtc application based on a mobile terminal includes a quality of service (QoS) improvement service, which improves QoS (for example: bandwidth) of a WebRtc application of user equipment. For example, when user equipment A and user equipment B perform WebRtc audio and video communication between each other, if it is found that user experience is relatively poor, the user equipment A needs to collect information about Internet Protocol (Internet Protocol, IP for short) addresses and service port numbers of the both parties in the communication, then send a service acceleration request to a QoS decision network element to improve QoS of an audio and video service of a current user, and send the collected information about the IP addresses and the service port numbers of the both parties in the communication to the QoS decision network element. The QoS decision network element forms a parameter by using the IP addresses and the service port numbers of the both parties in the communication, and sends an acceleration request to a policy and charging rule function entity (PCRF), to separately improve QoS of the user equipment A and QoS of the user equipment B, thereby improving user experience of audio and video communication performed between the user equipment A and the user equipment B.

The foregoing QoS improvement process of the WebRtc audio and video communications application in the prior art has the following problems: when user equipment A and user equipment B perform audio and video communication, if the user equipment A finds that user experience of the audio and video communication with the user equipment B is relatively poor, the user equipment A requests a QoS decision network element to perform QoS improvement. According to an existing QoS improvement processing method, the user equipment A can send a QoS improvement request to the QoS decision network element only after collecting information about IP addresses and service port numbers of the both parties that perform audio and video communication. The user equipment is responsible for collecting the IP addresses and the service port numbers of the both parties in the communication. Therefore, burden on the user equipment is relatively heavy, and difficulty in using the current QoS improvement method by a user is increased.

SUMMARY

Embodiments of the present invention provide a QoS improvement method, apparatus, and system, where a network side acquires IP addresses and service port numbers of both parties of user equipments in audio and video communication, to perform QoS improvement.

According to a first aspect, a QoS improvement method is provided, including: acquiring, by a WebRtc server, an IP address and a service port number of user equipment A, and an IP address and a service port number of user equipment B; and sending, by the WebRtc server, the IP address and the service port number of the user equipment A, and the IP address and the service port number of the user equipment B to a QoS decision network element, so that the QoS decision network element forms a parameter according to the IP address and the service port number of the user equipment A, and the IP address and the service port number of the user equipment B, and sends a QoS improvement request to a PCRF.

With reference to the first aspect, in a first possible implementation manner, the method includes: the acquiring, by a WebRtc server, an IP address and a service port number of user equipment A, and an IP address and a service port number of user equipment B includes: receiving, by the WebRtc server, call request signaling sent by the user equipment A to the user equipment B, where the call request signaling includes the IP address and the service port number of the user equipment A, and acquiring the IP address and the service port number of the user equipment A from the call request signaling; sending, by the WebRtc server, the call request signaling to the user equipment B; and receiving, by the WebRtc server, answer signaling returned by the user equipment B to the user equipment A, where the answer signaling includes the IP address and the service port number of the user equipment B, and acquiring the IP address and the service port number of the user equipment A from the answer signaling.

With reference to the first aspect or with reference to the first possible implementation manner of the first aspect, in a second possible implementation manner, after the acquiring, by a WebRtc server, an IP address and a service port number of user equipment A, and an IP address and a service port number of user equipment B, and before the sending the IP address and the service port number of the user equipment A, and the IP address and the service port number of the user equipment B to a QoS decision network element, the method includes: binding, by the WebRtc server, the IP address and the service port number of the user equipment A, and the IP address and the service port number of the user equipment B to a user identity of the user equipment A, and a user identity of the user equipment B respectively; receiving, by the WebRtc server, request signaling sent by the QoS decision network element, and requesting to acquire the IP address and the service port number of the user equipment A, and the IP address and the service port number of the user equipment B, where the request signaling includes the user identity of the user equipment A, and the user identity of the user equipment B; and obtaining, by the WebRtc, the IP address and the service port number of the user equipment A, and the IP address and the service port number of the user equipment B according to the user identity of the user equipment A, and the user identity of the user equipment B that are in the request signaling.

With reference to the first possible implementation manner of the first aspect, in a third possible implementation manner, the sending, by the WebRtc server, the IP address and the service port number of the user equipment A, and the IP address and the service port number of the user equipment B to a QoS decision network element specifically includes: after the receiving, by the WebRtc server, call request signaling sent by the user equipment A to the user equipment B, sending, by the WebRtc server, the IP address and the service port number of the user equipment A to the QoS decision network element; and after the receiving, by the WebRtc server, answer signaling returned by the user equipment B to the user equipment A, sending, by the WebRtc server, the IP address and the service port number of the user equipment B to the QoS decision network element.

With reference to the first possible implementation manner of the first aspect, in a fourth possible implementation manner, the sending, by the WebRtc server, the IP address and the service port number of the user equipment A, and the IP address and the service port number of the user equipment B to a QoS decision network element specifically includes:

after the receiving, by the WebRtc server, answer signaling returned by the user equipment B to the user equipment A, sending, by the WebRtc server, the IP address and the service port number of the user equipment A, and the IP address and the service port number of the user equipment B to the QoS decision network element.

According to a second aspect, another QoS improvement method is provided, including: acquiring, by a WebRtc server, an IP address and a service port number of user equipment A, and an IP address and a service port number of user equipment B; and receiving, by the WebRtc server, request signaling from a QoS decision network element, and requesting to acquire the service port number of the user equipment A and the service port number of the user equipment B, where the request signaling includes the IP address of the user equipment A and the IP address of the user equipment B; and acquiring, by the WebRtc server, the service port number of the user equipment A and the service port number of the user equipment B according to the IP address of the user equipment A and the IP address of the user equipment B, and sending the service port number of the user equipment A and the service port number of the user equipment B to the QoS decision network element, so that the QoS decision network element forms a parameter according to the IP address and the service port number of the user equipment A, and the IP address and the service port number of the user equipment B, and sends a QoS improvement request to a PCRF.

With reference to the second aspect, in a first possible implementation manner, the method includes: receiving, by the WebRtc server, call request signaling sent by the user equipment A to the user equipment B, where the call request signaling includes the IP address and the service port number of the user equipment A, and acquiring the IP address and the service port number of the user equipment A from the call request signaling; sending, by the WebRtc server, the call request signaling to the user equipment B; and receiving, by the WebRtc server, answer signaling returned by the user equipment B to the user equipment A, where the answer signaling includes the IP address and the service port number of the user equipment B According to a third aspect, another QoS improvement method is provided, including: receiving, by a QoS decision network element, an IP address and a service port number of user equipment A, and an IP address and a service port number of user equipment B that are sent by a WebRtc server; receiving, by the QoS decision network element, a service acceleration request sent by the user equipment A, and requesting to perform QoS improvement on a service between the user equipment A and the user equipment B; and forming, by the QoS decision network element, a parameter according to the IP address and the service port number of the user equipment A, and the IP address and the service port number of the user equipment B, and sending a QoS improvement request to a PCRF.

With reference to the third aspect, in a first possible implementation manner, the service acceleration request includes a user identity of the user equipment A, and a user identity of the user equipment B, and the method further includes: sending, by the QoS decision network element, request signaling to the WebRtc server, and requesting to acquire the IP address and the service port number of the user equipment A, and the IP address and the service port number of the user equipment B, where the request signaling includes the user identity of the user equipment A, and the user identity of the user equipment B; and the receiving, by a QoS decision network element, an IP address and a service port number of user equipment A, and an IP address and a service port number of user equipment B that are sent by a WebRtc server specifically includes: receiving, by the QoS decision network element, the IP address and the service port number of the user equipment A, and the IP address and the service port number of the user equipment B that are returned by the WebRtc server according to the user identity of the user equipment A, and the user identity of the user equipment B.

With reference to the third aspect, in a second possible implementation manner, the method further includes: when the user equipment A and the user equipment B are attached, acquiring, by the QoS decision network element, a user identity of the user equipment A and a user identity of the user equipment B that are sent by a mobile network; after the receiving, by a QoS decision network element, an IP address and a service port number of user equipment A, and an IP address and a service port number of user equipment B that are sent by a WebRtc server, the method further includes: binding, by the QoS decision network element, the IP address and the service port number of the user equipment A, and the IP address and the service port number of the user equipment B to the user identity of the user equipment A, and the user identity of the user equipment B respectively; and the receiving, by the QoS decision network element, a service acceleration request sent by the user equipment A, and the forming, by the QoS decision network element, a parameter according to the IP address and the service port number of the user equipment A, and the IP address and the service port number of the user equipment B, and sending a QoS improvement request to a PCRF include: receiving, by the QoS decision network element, a service acceleration request sent by the user equipment A, where the service acceleration request includes the user identity of the user equipment A, and the user identity of the user equipment B; and obtaining, by the QoS decision network element, the IP address and the service port number of the user equipment A, and the IP address and the service port number of the user equipment B by means of query according to the user identity of the user equipment A, and the user identity of the user equipment B, forming a parameter and sending a QoS improvement request to the PCRF.

According to a fourth aspect, another QoS improvement method is provided, including: receiving, by a QoS decision network element, an IP address of user equipment A, and an IP address of user equipment B that are sent by a mobile network; receiving, by the QoS decision network element, a service acceleration request sent by the user equipment A, and requesting to perform QoS improvement on a service between the user equipment A and the user equipment B; sending, by the QoS decision network element, request signaling to a WebRtc server, and requesting to acquire a service port number of the user equipment A, and a service port number of the user equipment B, where the request signaling includes the IP address of the user equipment A, and the IP address of the user equipment B; receiving, by the QoS decision network element, the service port number of the user equipment A, and the service port number of the user equipment B that are sent by the WebRtc server; and forming, by the QoS decision network element, a parameter according to the IP address and the service port number of the user equipment A, and the IP address and the service port number of the user equipment B, and sending a QoS improvement request to a PCRF.

With reference to the fourth aspect, in a first possible implementation manner, the receiving, by a QoS decision network element, an IP address of user equipment A, and an IP address of user equipment B that are sent by a mobile network includes:

when the user equipment A is attached, receiving, by the QoS decision network element, the IP address and a user identity of the user equipment A that are sent by the mobile network, and when the user equipment B is attached, receiving the IP address and a user identity of the user equipment B that are sent by the mobile network; and when the service acceleration request that is sent by the user equipment A and received by the QoS decision network element includes the user identity of the user equipment A, and the user identity of the user equipment B, before the sending, by the QoS decision network element, request signaling to a WebRtc server, the method further includes: obtaining, by the QoS decision network element, the IP address of the user equipment A, and the IP address of the user equipment B by means of query according to the user identity of the user equipment A, and the user identity of the user equipment B.

According to a fifth aspect, a QoS improvement apparatus is provided, including: a receiving module, configured to receive an IP address and a service port number of user equipment A, and an IP address and a service port number of user equipment B; and a sending module, configured to send the IP address and the service port number of the user equipment A, and the IP address and the service port number of the user equipment B to a QoS decision network element, so that the QoS decision network element forms a parameter according to the IP address and the service port number of the user equipment A, and the IP address and the service port number of the user equipment B, and sends a QoS improvement request to a PCRF.

With reference to the fifth aspect, in a first possible implementation manner, the receiving module is specifically configured to receive call request signaling sent by the user equipment A to the user equipment B, where the call request signaling includes the IP address and the service port number of the user equipment A, and acquire the IP address and the service port number of the user equipment A from the call request signaling; the sending module is further configured to send the call request signaling to the user equipment B; and the receiving module is specifically configured to receive answer signaling returned by the user equipment B to the user equipment A, where the answer signaling includes the IP address and the service port number of the user equipment B, and acquire the IP address and the service port number of the user equipment B from the answer signaling.

With reference to the fifth aspect or with reference to the first possible implementation manner of the fifth aspect, in a second possible implementation manner, the apparatus further includes: a processing module, configured to: after the receiving module receives the IP address and the service port number of the user equipment A, and the IP address and the service port number of the user equipment B, bind the received IP address and service port number of the user equipment A, and the received IP address and service port number of the user equipment B to a user identity of the user equipment A corresponding to the received IP address and service port number of the user equipment A, and a user identity of the user equipment B corresponding to the received IP address and service port number of the user equipment B respectively; the receiving module is further configured to receive request signaling sent by the QoS decision network element, and request to acquire the IP address and the service port number of the user equipment A, and the IP address and the service port number of the user equipment B, where the request signaling includes the user identity of the user equipment A, and the user identity of the user equipment B; and the sending module being configured to send the IP address and the service port number of the user equipment A, and the IP address and the service port number of the user equipment B to a QoS decision network element is specifically: sending, according to the user identity of the user equipment A, and the user identity of the user equipment B that are in the request signaling. the IP address and the service port number of the user equipment A, and the IP address and the service port number of the user equipment B that correspond to the user identities to the QoS decision network element.

With reference to the first possible implementation manner of the fifth aspect, in a third possible implementation manner, the sending module being configured to send the IP address and the service port number of the user equipment A, and the IP address and the service port number of the user equipment B to a QoS decision network element specifically includes: the sending module being configured to: after the receiving module receives the call request signaling sent by the user equipment A to the user equipment B, send the IP address and the service port number of the user equipment A to the QoS decision network element; and after the receiving module receives the answer signaling returned by the user equipment B to the user equipment A, send the IP address and the service port number of the user equipment B to the QoS decision network element.

With reference to the first possible implementation manner of the fifth aspect, in a fourth possible implementation manner, the sending module being configured to send the IP address and the service port number of the user equipment A, and the IP address and the service port number of the user equipment B to a QoS decision network element specifically includes: the sending module being configured to: after the receiving module receives the answer signaling returned by the user equipment B to the user equipment A, send the IP address and the service port number of the user equipment A, and the IP address and the service port number of the user equipment B to the QoS decision network element.

According to a sixth aspect, another QoS improvement apparatus is provided, including: a receiving module, configured to receive an IP address and a service port number of user equipment A, and an IP address and a service port number of user equipment B; and receive request signaling from a QoS decision network element, and request to acquire the service port number of the user equipment A, and the service port number of the user equipment B, where the request signaling includes the IP address of the user equipment A, and the IP address of the user equipment B; and a sending module, configured to: acquire the service port number of the user equipment A and the service port number of the user equipment B according to the IP address of the user equipment A and the IP address of the user equipment B, and send the service port number of the user equipment A and the service port number of the user equipment B to the QoS decision network element, so that the QoS decision network element forms a parameter according to the IP address and the service port number of the user equipment A, and the IP address and the service port number of the user equipment B, and sends a QoS improvement request to a PCRF.

With reference to the sixth aspect, in a first possible implementation manner, the receiving module is specifically configured to receive call request signaling sent by the user equipment A to the user equipment B, where the call request signaling includes the IP address and the service port number of the user equipment A, and acquire the IP address and the service port number of the user equipment A from the call request signaling; and receive answer signaling returned by the user equipment B to the user equipment A, where the answer signaling includes the IP address and the service port number of the user equipment B, and acquire the IP address and the service port number of the user equipment B from the answer signaling; and the sending module is further configured to: after the receiving module receives the call request signaling sent by the user equipment A to the user equipment B, send the call request signaling to the user equipment B.

According to a seventh aspect, another QoS improvement apparatus is provided, including: a receiving module, configured to receive an IP address and a service port number of user equipment A, and an IP address and a service port number of user equipment B that are sent by a WebRtc server; and receive a service acceleration request sent by the user equipment A; and a sending module, configured to form a parameter according to the IP address and the service port number of the user equipment A, and the IP address and the service port number of the user equipment B, and send a QoS improvement request to a PCRF.

With reference to the seventh aspect, in a first possible implementation manner, the service acceleration request includes a user identity of the user equipment A, and a user identity of the user equipment B, and the sending module is further configured to send request signaling to the WebRtc server, and request to acquire the IP address and the service port number of the user equipment A, and the IP address and the service port number of the user equipment B, where the request signaling includes the user identity of the user equipment A and the user identity of the user equipment B; and the receiving module being configured to receive an IP address and a service port number of user equipment A, and an IP address and a service port number of user equipment B that are sent by a WebRtc server specifically includes: the receiving module being configured to receive the IP address and the service port number of the user equipment A, and the IP address and the service port number of the user equipment B that are returned by the WebRtc server according to the user identity of the user equipment A, and the user identity of the user equipment B.

With reference to the seventh aspect, in a second possible implementation manner, the receiving module is further configured to: when the user equipment A and the user equipment B are attached, receive a user identity of the user equipment A, and a user identity of the user equipment B that are sent by a mobile network element; a processing module is configured to bind the IP address and the service port number of the user equipment A, and the IP address and the service port number of the user equipment B to the user identity of the user equipment A, and the user identity of the user equipment B respectively; and the receiving module being configured to receive a service acceleration request sent by the user equipment A, and the sending module being configured to form a parameter according to the IP address and the service port number of the user equipment A, and the IP address and the service port number of the user equipment B, and send a QoS improvement request to a PCRF include: the receiving module being configured to receive a service acceleration request sent by the user equipment A, where the service acceleration request includes the user identity of the user equipment A, and the user identity of the user equipment B; and the sending module being configured to obtain the IP address and the service port number of the user equipment A, and the IP address and the service port number of the user equipment B by means of query according to the user identity of the user equipment A, and the user identity of the user equipment B, form a parameter and send a QoS improvement request to the PCRF.

According to an eighth aspect, another QoS improvement apparatus is provided, including: a receiving module, configured to receive an IP address of user equipment A, and an IP address of user equipment B that are sent by a mobile network; receive a service acceleration request sent by the user equipment A; and receive a service port number of the user equipment A, and a service port number of the user equipment B that are sent by a WebRtc server; and a sending module, configured to send request signaling to the WebRtc server, and request to acquire the service port number of the user equipment A, and the service port number of the user equipment B, where the request signaling includes the IP address of the user equipment A, and the IP address of the user equipment B; and form a parameter according to the IP address and the service port number of the user equipment A, and the IP address and the service port number of the user equipment B, and send a QoS improvement request to a PCRF.

With reference to the eighth aspect, in a first possible implementation manner, the receiving module being configured to receive an IP address of user equipment A, and an IP address of user equipment B that are sent by a mobile network includes: the receiving module being configured to: when the user equipment A is attached, receive the IP address and a user identity of the user equipment A that are sent by the mobile network; and when the user equipment B is attached, receive the IP address and a user identity of the user equipment B that are sent by the mobile network; and when the service acceleration request sent by the user equipment A that the receiving module is configured to receive includes the user identity of the user equipment A, and the user identity of the user equipment B, before the sending module is configured to send the request signaling to the WebRtc server, the apparatus further includes: a query module, configured to obtain the IP address of the user equipment A, and the IP address of the user equipment B by means of query according to the user identity of the user equipment A, and the user identity of the user equipment B.

According to a ninth aspect, a QoS improvement system is provided, including: a WebRtc server, and a QoS decision network element, where the WebRtc server is configured to receive an IP address and a service port number of user equipment A, and an IP address and a service port number of user equipment B; and send the IP address and the service port number of the user equipment A, and the IP address and the service port number of the user equipment B to the QoS decision network element; and the QoS decision network element is configured to receive the IP address and the service port number of the user equipment A, and the IP address and the service port number of the user equipment B that are sent by the WebRtc server; receive a service acceleration request sent by the user equipment A; and form a parameter according to the IP address and the service port number of the user equipment A, and the IP address and the service port number of the user equipment B, and send a QoS improvement request to a PCRF.

With reference to the ninth aspect, in a first possible implementation manner, the WebRtc server is specifically configured to receive call request signaling sent by the user equipment A to the user equipment B, where the call request signaling includes the IP address and the service port number of the user equipment A, and acquire the IP address and the service port number of the user equipment A from the call request signaling; the WebRtc server is further configured to: after receiving the call request signaling sent by the user equipment A to the user equipment B, send the call request signaling to the user equipment B; and the WebRtc server is specifically configured to receive answer signaling returned by the user equipment B to the user equipment A, where the answer signaling includes the IP address and the service port number of the user equipment B, and acquire the IP address and the service port number of the user equipment B from the answer signaling.

With reference to the ninth aspect or with reference to the first possible implementation manner of the ninth aspect, in a second possible implementation manner, the WebRtc server is further configured to: after receiving the IP address and the service port number of the user equipment A, and the IP address and the service port number of the user equipment B, bind the received IP address and service port number of the user equipment A, and the received IP address and service port number of the user equipment B to a user identity of the user equipment A corresponding to the received IP address and service port number of the user equipment A, and a user identity of the user equipment B corresponding to the received IP address and service port number of the user equipment B respectively; the QoS decision network element is specifically configured to receive a service acceleration request sent by the user equipment A, where the service acceleration request includes the user identity of the user equipment A, and the user identity of the user equipment B; and send request signaling to the WebRtc server, and request to acquire the IP address and the service port number of the user equipment A, and the IP address and the service port number of the user equipment B, where the request signaling includes the user identity of the user equipment A, and the user identity of the user equipment B; and the WebRtc server being configured to send the IP address and the service port number of the user equipment A, and the IP address and the service port number of the user equipment B to the QoS decision network element is specifically: the WebRtc server being configured to send, according to the user identity of the user equipment A, and the user identity of the user equipment B that are in the request signaling, the IP address and the service port number of the user equipment A, and the IP address and the service port number of the user equipment B that correspond to the user identities to the QoS decision network element.

With reference to the first possible implementation manner of the ninth aspect, in a third possible implementation manner, the WebRtc server being configured to send the IP address and the service port number of the user equipment A, and the IP address and the service port number of the user equipment B to the QoS decision network element specifically includes:

the WebRtc server being configured to: after receiving the call request signaling sent by the user equipment A to the user equipment B, send the IP address and the service port number of the user equipment A to the QoS decision network element; and after receiving the answer signaling returned by the user equipment B to the user equipment A, send the IP address and the service port number of the user equipment B to the QoS decision network element.

With reference to the first possible implementation manner of the ninth aspect, in a fourth possible implementation manner, the WebRtc server being configured to send the IP address and the service port number of the user equipment A, and the IP address and the service port number of the user equipment B to the QoS decision network element specifically includes:

the WebRtc server being configured to: after receiving the answer signaling returned by the user equipment B to the user equipment A, send the IP address and the service port number of the user equipment A, and the IP address and the service port number of the user equipment B to the QoS decision network element.

With reference to the ninth aspect or with reference to the first, third or fourth possible implementation manner of the ninth aspect, in a fifth possible implementation manner, the QoS decision network element is further configured to: when the user equipment A and the user equipment B are attached, receive a user identity of the user equipment A and a user identity of the user equipment B that are sent by a mobile network element; and after receiving the IP address and the service port number of the user equipment A, and the IP address and the service port number of the user equipment B that are sent by the WebRtc server, bind the IP address and the service port number of the user equipment A, and the IP address and the service port number of the user equipment B to the user identity of the user equipment A, and the user identity of the user equipment B respectively; and the QoS decision network element being configured to receive a service acceleration request sent by the user equipment A; and form a parameter according to the IP address and the service port number of the user equipment A, and the IP address and the service port number of the user equipment B, and send a QoS improvement request to a PCRF includes: the QoS decision network element being configured to receive a service acceleration request sent by the user equipment A, where the service acceleration request includes the user identity of the user equipment A, and the user identity of the user equipment B; and configured to obtain the IP address and the service port number of the user equipment A, and the IP address and the service port number of the user equipment B by means of query according to the user identity of the user equipment A, and the user identity of the user equipment B, form a parameter and send a QoS improvement request to the PCRF.

According to a tenth aspect, another QoS improvement system is provided, including: a WebRtc server, a QoS decision network element, user equipment A, and user equipment B, where the WebRtc server is configured to receive an IP address and a service port number of the user equipment A, and an IP address and a service port number of the user equipment B; receive request signaling from the QoS decision network element, and request to acquire the service port number of the user equipment A, and the service port number of the user equipment B, where the request signaling includes the IP address of the user equipment A, and the IP address of the user equipment B; and acquire the service port number of the user equipment A, and the service port number of the user equipment B according to the IP address of the user equipment A, and the IP address of the user equipment B, and send the service port number of the user equipment A, and the service port number of the user equipment B to the QoS decision network element; and the QoS decision network element is configured to receive the IP address of the user equipment A, and the IP address of the user equipment B that are sent by a mobile network; receive a service acceleration request sent by the user equipment A; send request signaling to the WebRtc server; receive the service port number of the user equipment A, and the service port number of the user equipment B that are sent by the WebRtc server; and form a parameter according to the IP address and the service port number of the user equipment A, and the IP address and the service port number of the user equipment B, and send a QoS improvement request to a PCRF.

With reference to the tenth aspect, in a first possible implementation manner, the WebRtc server is specifically configured to receive call request signaling sent by the user equipment A to the user equipment B, where the call request signaling includes the IP address and the service port number of the user equipment A, and acquire the IP address and the service port number of the user equipment A from the call request signaling; the WebRtc server is further configured to: after the receiving module receives the call request signaling sent by the user equipment A to the user equipment B, send the call request signaling to the user equipment B; and the WebRtc server is specifically configured to receive answer signaling returned by the user equipment B to the user equipment A, where the answer signaling includes the IP address and the service port number of the user equipment B, and acquire the IP address and the service port number of the user equipment B from the answer signaling.

With reference to the tenth aspect or the first possible implementation manner of the tenth aspect, in a second possible implementation manner, the QoS decision network element being configured to receive the IP address of the user equipment A, and the IP address of the user equipment B that are sent by a mobile network includes: the QoS decision network element being configured to: when the user equipment A is attached, receive the IP address and a user identity of the user equipment A that are sent by the mobile network; and when the user equipment B is attached, receive the IP address and a user identity of the user equipment B that are sent by the mobile network; and when the service acceleration request sent by the user equipment A that the QoS decision network element is configured to receive includes the user identity of the user equipment A, and the user identity of the user equipment B, before the QoS decision network element is configured to send the request signaling to the WebRtc server, the QoS decision network element being configured to receive the IP address of the user equipment A, and the IP address of the user equipment B that are sent by a mobile network further includes: the QoS decision network element being configured to obtain the IP address of the user equipment A, and the IP address of the user equipment B by means of query according to the user identity of the user equipment A, and the user identity of the user equipment B.

Based on the foregoing technical solutions, according to the QoS improvement method, apparatus, and system provided in the embodiments of the present invention, a network side acquires IP addresses and service port numbers of both parties of user equipments that perform audio and video communication, so that a previous manner in which a single party of user equipment collects IP addresses and service port numbers of both parties of user equipments that perform audio and video communication is changed, which lightens burden on the user equipment during QoS improvement, and reduces difficulty in using the current QoS improvement method by the user equipment.

BRIEF DESCRIPTION OF THE DRAWINGS

To describe the technical solutions in the embodiments of the present invention more clearly, the following briefly describes the accompanying drawings required for describing the embodiments of the present invention or the prior art. Apparently, the accompanying drawings in the following description show merely some embodiments of the present invention, and a person of ordinary skill in the art may still derive other drawings from these accompanying drawings without creative efforts.

FIG. 1 is a schematic diagram of a network architecture on which embodiments of the present invention are based;

FIG. 2 is a schematic flowchart of a QoS improvement method according to Embodiment 1 of the present invention;

FIG. 5 is a schematic flowchart of a QoS improvement method according to Embodiment 4 of the present invention;

DETAILED DESCRIPTION OF ILLUSTRATIVE EMBODIMENTS

Figure 3:
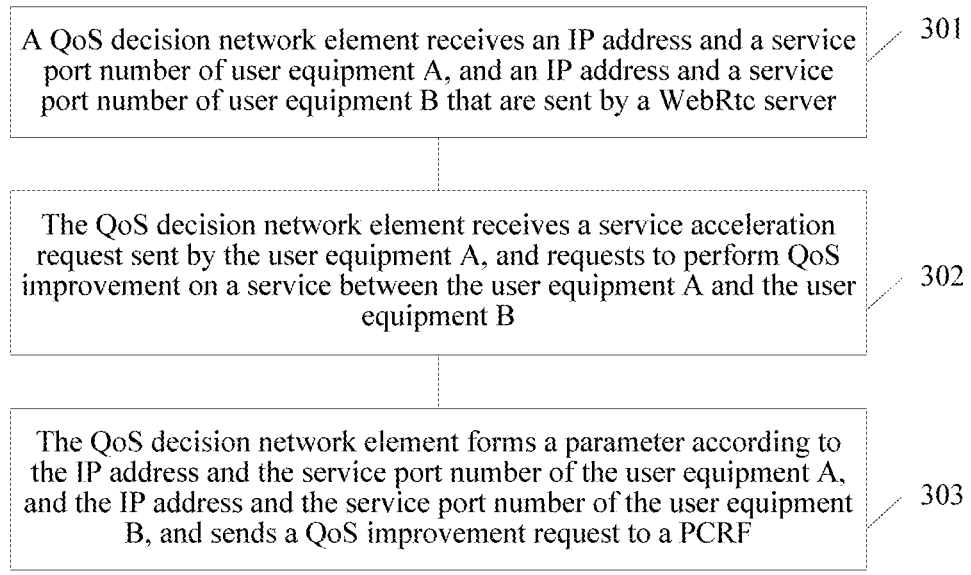
FIG. 3 is a schematic flowchart of a QoS improvement method according to Embodiment 2 of the present invention.

To make the objectives, technical solutions, and advantages of the present invention more clearly, the following further describes the technical solutions provided in the present invention with reference to the accompanying drawings and embodiments. Apparently, the described embodiments are merely a part rather than all of the embodiments of the present invention. Other embodiments obtained by a person of ordinary skill in the art based on the embodiments of the present invention without creative efforts shall fall within the protection scope of the present invention.

It should be understood that the technical solutions provided in the embodiments of the present invention can be applied to the following communications networks, including but not limited to: a Universal Mobile Telecommunications System (UMTS) system, a Long Term Evolution (LTE) system, a Long Term Evolution advanced (LTE-A) system, a Worldwide Interoperability for Microwave Access (WiMAX) system, a Ultra-Mobile Broadband (UMB) system, and the like. The terms "network" and "system" can be interchanged with each other. The terms "network" and "system" can be interchanged with each other.

FIG. 1 is a schematic diagram of a network architecture on which embodiments of the present invention are based. It should be understood that, the network architecture shown in FIG. 1 is a preferred application architecture of the embodiments of the present invention, but the embodiments of the present invention may be further based on another network architecture, which is not limited in the embodiments of the present invention.

As shown in FIG. 1, in a network architecture that is configured to perform QoS improvement and includes user equipments, a radio access network, a WebRtc server, a QoS decision network element, and a PCRF, the WebRtc server may connect both parties of the user equipments after the user equipments log in, and provide an audio and video communications service to the both parties of the user equipments. The QoS decision network element may receive IP addresses and service port numbers of the both parties of the user equipments, and after the user equipments initiate a service acceleration request, send the IP addresses and the service port numbers of the both parties of the users to the PCRF by using a packet data network gateway (PDN Gateway), and request to perform QoS improvement. The QoS decision network element may be an open platform (Open Platform), or may be a service delivery platform (SDP), or may be an application programming interface gateway (API), which is not limited in the embodiments of the present invention.

FIG. 2 is a schematic flowchart of a QoS improvement method according to Embodiment 1 of the present invention. The method may be performed by any suitable apparatus, for example, a WebRtc server, but the present invention is not limited thereto. As shown in FIG. 2, the QoS improvement method in this embodiment may include the following steps:

Step 201: A WebRtc server acquires an IP address and a service port number of user equipment A, and an IP address and a service port number of user equipment B.

Step 202: The WebRtc server sends the IP address and the service port number of the user equipment A, and the IP address and the service port number of the user equipment B to a QoS decision network element, so that the QoS decision network element forms a parameter according to the IP address and the service port number of the user equipment A, and the IP address and the service port number of the user equipment B, and sends a QoS improvement request to a PCRF.

Therefore, according to the QoS improvement method in this embodiment of the present invention, a WebRtc server acquires an IP address and a service port number of user equipment A, and an IP address and a service port number of user equipment B, and sends the IP address and the service port number of the user equipment A, and the IP address and the service port number of the user equipment B to a QoS decision network element, so that a manner in which the user equipment A collects and connects the IP addresses and the service port numbers of the both parties in the prior art is changed, which lightens burden on the user equipment A, and reduces difficulty in using the current QoS improvement method by a user.

Specifically, in step 201, that a WebRtc server acquires an IP address and a service port number of user equipment A, and an IP address and a service port number of user equipment B may be: the WebRtc server acquires the IP address and the service port number of the user equipment A, and the IP address and the service port number of the user equipment B during communication between the user equipment A and the user equipment B, for example:

Step 201a: The WebRtc server receives call request signaling sent by the user equipment A to the user equipment B, where the call request signaling includes the IP address and the service port number of the user equipment A, that is, the WebRtc server acquires the IP address and the service port number of the user equipment A from the call request signaling.

Step 201b: The WebRtc server sends the call request signaling to the user equipment B.

Step 201c: The WebRtc server receives answer signaling returned by the user equipment B to the user equipment A, where the answer signaling includes the IP address and the service port number of the user equipment B, that is, the WebRtc server acquires the IP address and the service port number of the user equipment B from the answer signaling.

Optionally, in another embodiment of the present invention, after step 201 and before step 202, the method includes:

Step a: The WebRtc server binds the IP address and the service port number of the user equipment A, and the IP address and the service port number of the user equipment B to a user identity of the user equipment A, and a user identity of the user equipment B respectively.

The user identity may include at least one of the following: a user equipment account number or mobile station international integrated service digital network number (Mobile Station international Integrated Service Digital Network number, MSISDN for short) information of user equipment. Certainly, another identity that may identify a user may also be applied to the embodiments of the present invention; therefore, the present invention is not limited thereto.

Step b: The WebRtc server receives request signaling sent by the QoS decision network element, and requests to acquire the IP address and the service port number of the user equipment A, and the IP address and the service port number of the user equipment B, where the request signaling includes the user identity of the user equipment A, and the user identity of the user equipment B.

Step c: The WebRtc obtains the IP address and the service port number of the user equipment A, and the IP address and the service port number of the user equipment B according to the user identity of the user equipment A, and the user identity of the user equipment B that are in the request signaling.

Optionally, in another embodiment of the present invention, that the WebRtc server sends the IP address and the service port number of the user equipment A, and the IP address and the service port number of the user equipment B to a QoS decision network element may specifically include: after the WebRtc server receives the call request signaling sent by the user equipment A to the user equipment B, the WebRtc server sends the IP address and the service port number of the user equipment A to the QoS decision network element; and after the WebRtc server receives the answer signaling returned by the user equipment B to the user equipment A, the WebRtc server sends the IP address and the service port number of the user equipment B to the QoS decision network element. Alternatively, in another embodiment of the present invention, that the WebRtc server sends the IP address and the service port number of the user equipment A, and the IP address and the service port number of the user equipment B to the QoS decision network element may specifically include: after the WebRtc server receives the answer signaling returned by the user equipment B to the user equipment A, the WebRtc server sends the IP address and the service port number of the user equipment A, and the IP address and the service port number of the user equipment B to the QoS decision network element.

FIG. 3 is a schematic flowchart of a QoS improvement method according to Embodiment 2 of the present invention. The method may be performed by any suitable apparatus, for example, a QoS decision network element, but the present invention is not limited thereto. Optionally, this embodiment may be combined with Embodiment 1 of the present invention.

As shown in FIG. 3, the QoS improvement method provided in this embodiment may include the following steps:

Step 301: A QoS decision network element receives an IP address and a service port number of user equipment A, and an IP address and a service port number of user equipment B that are sent by a WebRtc server.

Step 302: The QoS decision network element receives a service acceleration request sent by the user equipment A, and requests to perform QoS improvement on a service between the user equipment A and the user equipment B.

Specifically, the sequence of step 301 and step 302 is not limited in this embodiment of the present invention.

Step 303: The QoS decision network element forms a parameter according to the IP address and the service port number of the user equipment A, and the IP address and the service port number of the user equipment B, and sends a QoS improvement request to a PCRF.

Therefore, according to the QoS improvement method in this embodiment of the present invention, a QoS decision network element receives an IP address and a service port number of user equipment A, and an IP address and a service port number of user equipment B that are sent by a WebRtc server, so that a manner in which the user equipment A collects and connects the IP addresses and the service port numbers of the both parties in the prior art is changed, which lightens burden on the user equipment A, and reduces difficulty in using the current QoS improvement method by a user.

Optionally, in another embodiment of the present invention, step 301 is performed after step 302. The service acceleration request in step 302 includes a user identity of the user equipment A, and a user identity of the user equipment B; after step 302, this embodiment further includes: the QoS decision network element sends request signaling to the WebRtc server, and requests to acquire the IP address and the service port number of the user equipment A, and the IP address and the service port number of the user equipment B, where the request signaling includes the user identity of the user equipment A, and the user identity of the user equipment B; and step 301 specifically includes: the QoS decision network element receives the IP address and the service port number of the user equipment A, and the IP address and the service port number of the user equipment B that are returned by the WebRtc server according to the user identity of the user equipment A, and the user identity of the user equipment B.

Optionally, in another embodiment of the present invention, step 301 is performed before step 302. This embodiment further includes: when the user equipments are attached, the QoS decision network element acquires user identities of the user equipments that are sent by a mobile network element (for example, the user identities include MSISDN information of the user equipments, which is sent by the mobile network element to the QoS decision network element when the user equipments are attached, but the present invention is not limited thereto); and the QoS decision network element binds the IP address and the service port number of the user equipment A, and the IP address and the service port number of the user equipment B to the user identity of the user equipment A, and the user identity of the user equipment B respectively; and step 302 and step 303 include: the QoS decision network element receives a service acceleration request sent by the user equipment A, where the service acceleration request includes the user identity of the user equipment A, and the user identity of the user equipment B; and the QoS decision network element obtains the IP address and the service port number of the user equipment A, and the IP address and the service port number of the user equipment B by means of query according to the user identity of the user equipment A, and the user identity of the user equipment B, forms a parameter and sends a QoS improvement request to the PCRF.

Figure 4:
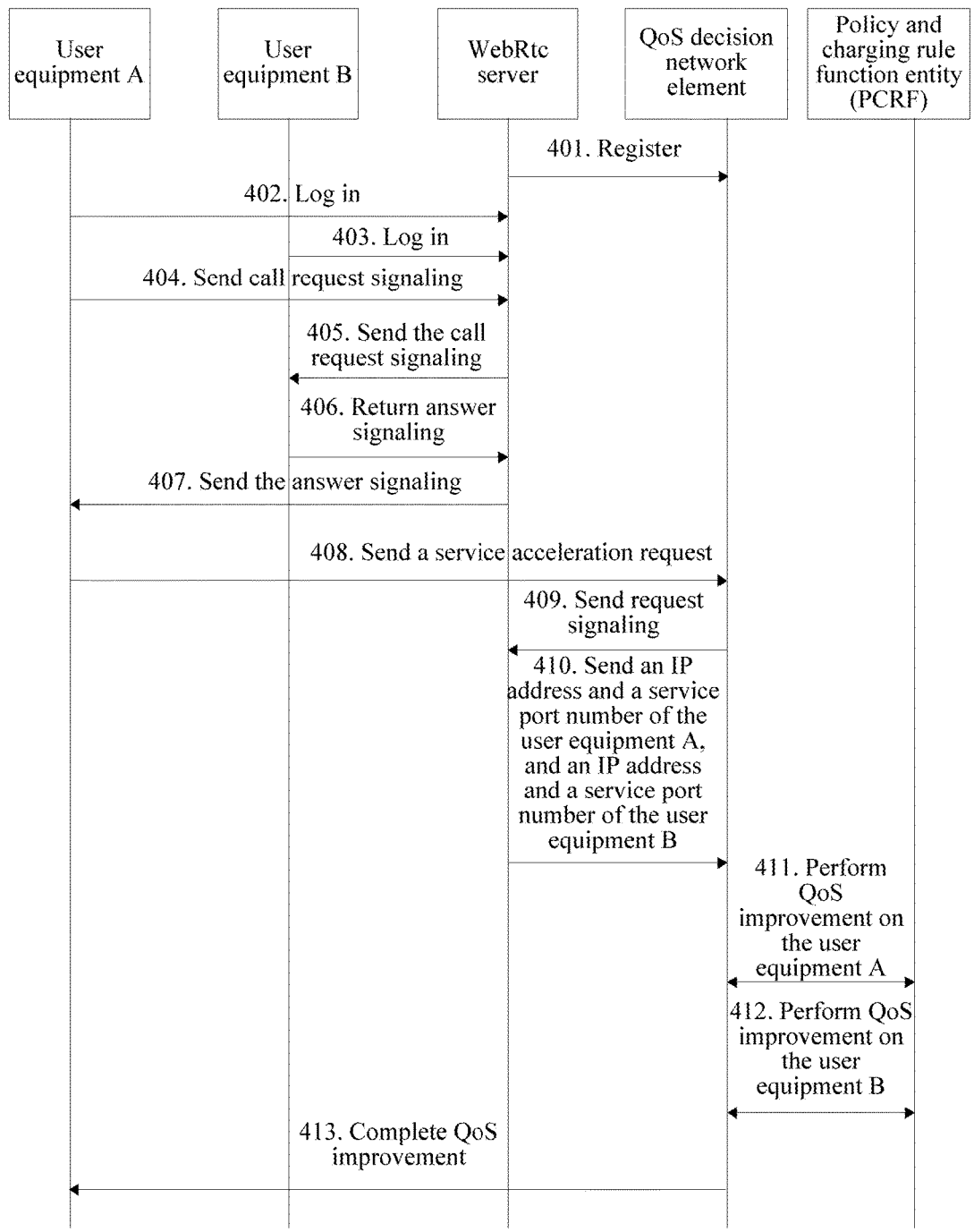
FIG. 4 is a schematic flowchart of a QoS improvement method according to Embodiment 3 of the present invention.

FIG. 4 is a schematic flowchart of a QoS improvement method according to Embodiment 3 of the present invention. This embodiment is a specific embodiment of Embodiment 1 of the present invention and Embodiment 2 of the present invention. In this embodiment, a WebRtc server acquires an IP address and a service port number of user equipment A, and an IP address and a service port number of user equipment B, and when receiving request signaling sent by a QoS decision network element to the WebRtc server, the WebRtc server sends the IP address and the service port number of the user equipment A, and the IP address and the service port number of the user equipment B that are acquired to the QoS decision network element. As shown in FIG. 4, the QoS improvement method in this embodiment includes the following steps:

Step 401: A WebRtc server registers with a QoS decision network element.

Specifically, when being started, the WebRtc server invokes an interface of the QoS decision network element to register an IP address of the WebRtc server with the QoS decision network element, so that in a subsequent interaction process, the QoS decision network element is connected to the WebRtc server; an effect of this step is to enable the WebRtc server to establish a connection to the QoS decision network element; therefore, this step is performed before the WebRtc server interacts with the QoS decision network element, and this step is not limited to a step first performed. For definitions of related steps in subsequent embodiments, reference may be made to this embodiment.

Step 402: User equipment A logs in to the WebRtc server, and the WebRtc server acquires a user identity of the user equipment A.

When the user equipment A logs in to the WebRtc server, the user equipment A establishes a persistent connection to the WebRtc server, where the persistent connection may identify the user equipment A, and subsequently, all information sent by the user equipment A to the WebRtc server is transmitted from the persistent connection, where the WebRtc server may identify that all the information transmitted from the persistent connection is related information of the user equipment A. If there is a need, the WebRtc may store these pieces of information together.

The user identity includes a user equipment account number, and MSISDN information.

Further, the WebRtc server allocates an ID (peerID) to the user equipment A, and binds the peerID to the user identity of the user equipment A. The peerID is an end ID of a signaling sending end or receiving end based on a WebRtc protocol.

Step 403: User equipment B logs in to the WebRtc server, and the WebRtc server acquires a user identity of the user equipment B.

For a specific process, reference may be made to a login process of the user equipment A, that is, the WebRtc server establishes a persistent connection to the user equipment B, allocates a peerID, and binds the peerID to the user identity of the user equipment B.

Step 404: The WebRtc server receives call request signaling initiated by the user equipment A, and requests to connect to the user equipment B.

The call request signaling includes information about an IP address and a service port number of the user equipment A and a peerID of a requested end: the user equipment B.

The call request signaling may be sent to the WebRtc server by means of the persistent connection established in step 302, and the WebRtc server identifies that the call request signaling is from the user equipment A. The WebRtc server extracts the information about the IP address and the service port number of the user equipment A from the call request signaling, and binds the information to the user identity of the user equipment A. According to the step, a correspondence may be formed between the user identity, and the IP address and the service port number of the user equipment. Step 405: The WebRtc server sends the call request signaling of the user equipment A to the user equipment B.

The WebRtc server may send the call request signaling to the user equipment B according to the peerID of the user equipment B that is included in the call request signaling received in step 404.

Step 406: The WebRtc server receives answer signaling returned by the user equipment B.

Specifically, the answer signaling includes the information about the IP address and the service port number of the user equipment B, and the peer ID of the user equipment A, and the WebRtc server acquires the information about the IP address and the service port number of the user equipment B, and binds the information to the user identity of the user equipment B and stores the information and the user identity of the user equipment B (for the process, reference may be made to step 404).

Step 407: The WebRtc server sends the answer signaling of the user equipment B to the user equipment A, to complete establishment of audio and video communication.

The WebRtc server may send the answer signaling to the user equipment A according to the peerID of the user equipment A that is included in the answer signaling received in step 406.

Step 408: The user equipment A initiates a service acceleration request to the QoS decision network element. Specifically, the service acceleration request includes the user identity of the user equipment A, and the user identity of the user equipment B. In the service acceleration request, an acceleration application programming interface (Application Programming Interface, API for short) of the QoS decision network element may be further invoked.

Step 409: The QoS decision network element sends request signaling to the WebRtc server, and requests to acquire the IP address and the service port number of the user equipment A, and the IP address and the service port number of the user equipment B, where the request signaling includes the user identity of the user equipment A, and the user identity of the user equipment B.

Step 410: The WebRtc server sends information about an IP and a port number of the user equipment A, and information about the IP address and the service port number of the user equipment B to the QoS decision network element.

Specifically, the WebRtc server queries the IP address and the service port number of the user equipment A, and the IP address and the service port number of the user equipment B according to the correspondence, established in step 404 and step 406, between the user identity, and the IP address and the service port number of the user equipment, and sends the IP address and the service port number of the user equipment A, and the IP address and the service port number of the user equipment B to the QoS decision network element.

Step 411: The QoS decision network element forms a parameter according to the IP address and the service port number of the user equipment A, and the IP address and the service port number of the user equipment B, and sends a QoS improvement request to a PCRF.

Specifically, the QoS decision network element may use the IP address and the service port number of the user equipment A as a source address and a source port number, and use the IP address and the service port number of the user equipment B as a destination address and a destination port number, form a parameter and send a request to the PCRF, to perform QoS improvement on the user equipment A. The QoS decision network element uses the IP address and the service port number of the user equipment B as a source address and a source port number, uses the IP address and the service port number of the user equipment A as a destination address and a destination port number, forms a parameter and sends a request to the PCRF, to perform QoS improvement on the user equipment B.

Step 413: The QoS decision network element server returns a QoS improvement result to the user equipment A, to complete QoS improvement.

Therefore, based on the QoS improvement method in this embodiment of the present invention, a WebRtc server acquires an IP address and a service port number of user equipment A, and an IP address and a service port number of user equipment B, and when receiving request signaling sent by a QoS decision network element to the WebRtc server, sends the IP address and the service port number of the user equipment A, and the IP address and the service port number of the user equipment B to the QoS decision network element, so that a manner in which the user equipment A collects and connects the IP addresses and the service port numbers of the both parties in the prior art is changed, which lightens burden on the user equipment A, reduces difficulty in using the current QoS improvement method by a user, and improves user friendliness.

FIG. 5 is a schematic flowchart of a QoS improvement method according to Embodiment 4 of the present invention. This embodiment is a specific embodiment of Embodiment 1 of the present invention and Embodiment 2 of the present invention. In this embodiment, after acquiring an IP address and a service port number of user equipment A, and an IP address and a service port number of user equipment B, a WebRtc server sends the IP address and the service port number of the user equipment A, and the IP address and the service port number of the user equipment B to a QoS decision network element, and the QoS decision network element stores the IP address and the service port number of the user equipment A, and the IP address and the service port number of the user equipment B, so as to perform QoS improvement.

As shown in FIG. 5, the QoS improvement method in this embodiment includes the following steps:

For step 501 to step 503, reference may be made to step 401 to step 403 in Embodiment 3 of the present invention.

Step 504: The WebRtc server receives call request signaling initiated by the user equipment A, and requests to connect to the user equipment B.

Specifically, reference may be made to step 404 in Embodiment 3 of the present invention.

Step 505: The WebRtc server sends an IP address and a service port number of the user equipment A that are in the call request signaling to the QoS decision network element.

Specifically, the QoS decision network element receives the IP address and the service port number of the user equipment A, and binds the IP address and the service port number of the user equipment A to the user identity of the user equipment A.

Specifically, the user identity of the user equipment A is sent by a mobile network to the QoS decision network element when the user equipment A is attached to the mobile network.

Step 506: The WebRtc server sends the call request signaling of the user equipment A to the user equipment B.

Step 507: The WebRtc server receives answer signaling sent by the user equipment B.

Specifically, reference may be made to step 406 in Embodiment 3 of the present invention.

Step 508: The WebRtc server sends an IP address and a service port number of the user equipment B that are in the answer signaling to the QoS decision network element.

Specifically, reference may be made to step 505.

Optionally, as another embodiment, step 505 and step 508 may be combined and performed, that is, after the WebRtc server acquires the IP address and the service port number of the user equipment A in step 505, the IP address and the service port number of the user equipment A may be buffered to the WebRtc server, and sent to the QoS decision network element together with the IP address and the service port number of the user equipment B that are acquired by the WebRtc server subsequently in step 508, and the IP address and the service port number of the user equipment A and the IP address and the service port number of the user equipment B are bound to a corresponding user identity of the user equipment A, and a corresponding user identity of the user equipment B that are in the QoS decision network element respectively.

Step 509: The WebRtc server sends the answer signaling of the user equipment B to the user equipment A, to complete establishment of audio and video communication.

Step 510: The user equipment A initiates a service acceleration request, requests to perform acceleration on a service between the user equipment A and the user equipment B, and invokes an acceleration API of the QoS decision network element.

Specifically, the service acceleration request includes the user identity of the user equipment A, and the user identity of the user equipment B.

Step 511: The QoS decision network element queries the IP address and the service port number of the user equipment A, and the IP address and the service port number of the user equipment B in a local database according to the user identity of the user equipment A, and the user identity of the user equipment B, uses the IP address and the service port number of the user equipment A as a source address and a source port number, uses the IP address and the service port number of the user equipment B as a destination address and a destination port number, forms a parameter and sends a request to a PCRF, to perform QoS improvement on the user equipment A.

Step 512: The QoS decision network element uses the IP address and the service port number of the user equipment B as a source address and a source port number, uses the IP address and the service port number of the user equipment A as a destination address and a destination port number, forms a parameter and sends a request to the PCRF, to perform QoS improvement on the user equipment B.

Step 513: The QoS decision network element server returns a QoS improvement result to the user equipment A, to complete QoS improvement.

Therefore, based on the QoS improvement method in this embodiment of the present invention, after acquiring an IP address and a service port number of user equipment A, and an IP address and a service port number of user equipment B, a WebRtc server may actively send the IP address and the service port number of the user equipment A, and the IP address and the service port number of the user equipment B to a QoS decision network element, and the QoS decision network element stores the IP address and the service port number of the user equipment A, and the IP address and the service port number of the user equipment B, so as to perform QoS improvement, so that a manner in which the user equipment A collects and connects the IP addresses and the service port numbers of the both parties in the prior art is changed, which lightens burden on the user equipment A, reduces difficulty in using the current QoS improvement method by a user, and improves user friendliness.

Figure 6:
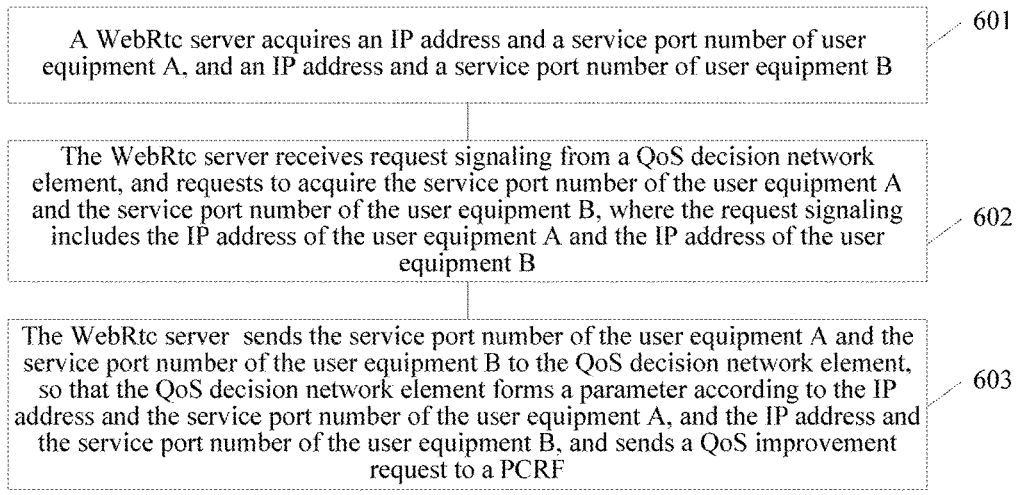
FIG. 6 is a schematic flowchart of a QoS improvement method according to Embodiment 5 of the present invention.

FIG. 6 is a schematic flowchart of a QoS improvement method according to Embodiment 5 of the present invention.

The method may be performed by any suitable apparatus, for example, a WebRtc server, but the present invention is not limited thereto. As shown in FIG. 6, the QoS improvement method in this embodiment may include the following steps:

Step 601: A WebRtc server acquires an IP address and a service port number of user equipment A, and an IP address and a service port number of user equipment B.

Step 602: The WebRtc server receives request signaling from a QoS decision network element, and requests to acquire the service port number of the user equipment A and the service port number of the user equipment B, where the request signaling includes the IP address of the user equipment A and the IP address of the user equipment B.

Step 603: The WebRtc server acquires the service port number of the user equipment A and the service port number of the user equipment B according to the IP address of the user equipment A and the IP address of the user equipment B, and sends the service port number of the user equipment A and the service port number of the user equipment B to the QoS decision network element, so that the QoS decision network element forms a parameter according to the IP address and the service port number of the user equipment A, and the IP address and the service port number of the user equipment B, and sends a QoS improvement request to a PCRF.

Therefore, according to the QoS improvement method in this embodiment of the present invention, a WebRtc server acquires a service port number of user equipment A, and a service port number of user equipment B, and sends the service port number of the user equipment A, and the service port number of the user equipment B to a QoS decision network element, so as to perform QoS improvement in combination with an IP address of the user equipment A and an IP address of the user equipment B that are in the QoS decision network element, so that a manner in which the user equipment A collects and connects the IP addresses and the service port numbers of the both parties in the prior art is changed, which lightens burden on the user equipment A, and reduces difficulty in using the current QoS improvement method by a user.

Specifically, in step 601, the WebRtc server receives call request signaling sent by the user equipment A to the user equipment B, where the call request signaling includes the IP address and the service port number of the user equipment A, and acquires the IP address and the service port number of the user equipment A from the call request signaling; the WebRtc server sends the call request signaling to the user equipment B; and the WebRtc server receives answer signaling returned by the user equipment B to the user equipment A, where the answer signaling includes the IP address and the service port number of the user equipment B, and acquires the IP address and the service port number of the user equipment B from the answer signaling.

Figure 7:
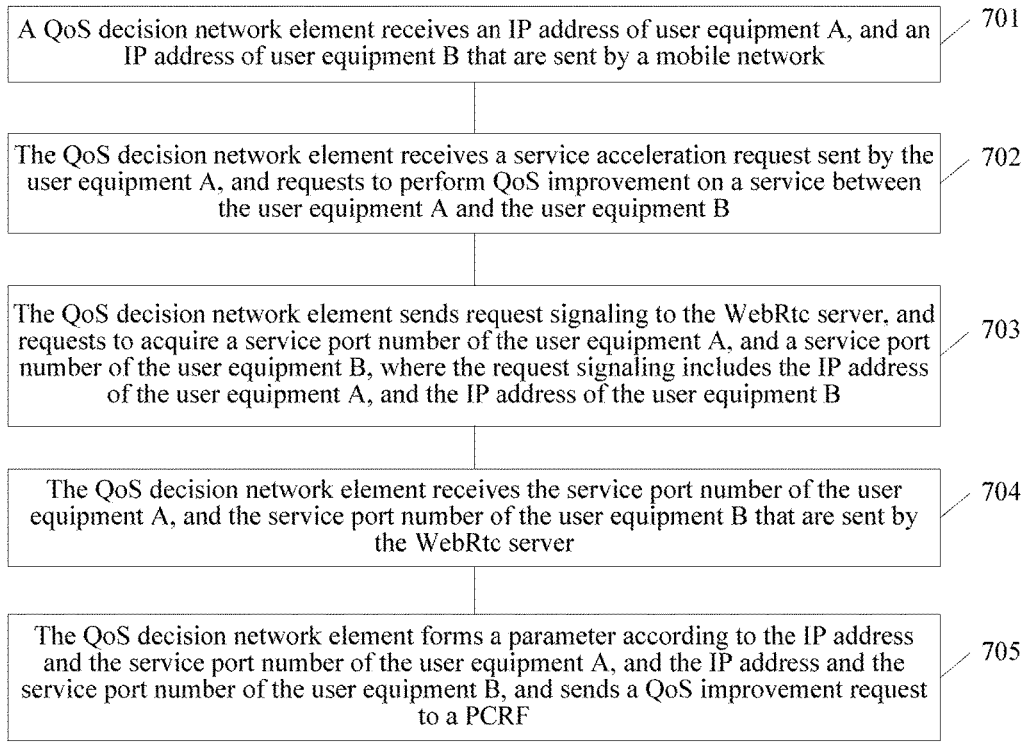
FIG. 7 is a schematic flowchart of a QoS improvement method according to Embodiment 6 of the present invention.

FIG. 7 is a schematic flowchart of a QoS improvement method according to Embodiment 6 of the present invention. The method may be performed by any suitable apparatus, for example, a QoS decision network element, but the present invention is not limited thereto. Optionally, this embodiment may be combined with Embodiment 5 of the present invention.

As shown in FIG. 7, the QoS improvement method provided in this embodiment may include the following steps:

Step 701: A QoS decision network element receives an IP address of user equipment A, and an IP address of user equipment B that are sent by a mobile network.

Step 702: The QoS decision network element receives a service acceleration request sent by the user equipment A, and requests to perform QoS improvement on a service between the user equipment A and the user equipment B.

Step 703: The QoS decision network element sends request signaling to the WebRtc server, and requests to acquire a service port number of the user equipment A, and a service port number of the user equipment B, where the request signaling includes the IP address of the user equipment A, and the IP address of the user equipment B.

Step 704: The QoS decision network element receives the service port number of the user equipment A, and the service port number of the user equipment B that are sent by the WebRtc server.

Step 705: The QoS decision network element forms a parameter according to the IP address and the service port number of the user equipment A, and the IP address and the service port number of the user equipment B, and sends a QoS improvement request to a PCRF.

Therefore, according to the QoS improvement method in this embodiment of the present invention, a QoS decision network element receives an IP address of user equipment A, and an IP address of user equipment B that are sent by a mobile network, and receives a service port number of the user equipment A, and a service port number of the user equipment B that are sent by a WebRtc, so as to perform QoS improvement, so that a manner in which the user equipment A collects and connects the IP addresses and the service port numbers of the both parties in the prior art is changed, which lightens burden on the user equipment A, and reduces difficulty in using the current QoS improvement method by a user.

Specifically, that the QoS decision network element receives an IP address of user equipment A, and an IP address of user equipment B that are sent by a mobile network includes: when the user equipment A is attached, the QoS decision network element receives the IP address and a user identity of the user equipment A that are sent by the mobile network, and when the user equipment B is attached, receives the IP address and a user identity of the user equipment B that are sent by the mobile network, where the user identity includes MSISDN information; and when the service acceleration request that is sent by the user equipment A and received by the QoS decision network element includes the user identity of the user equipment A, and the user identity of the user equipment B, before the QoS decision network element sends request signaling to the WebRtc server, the method further includes: the QoS decision network element obtains the IP address of the user equipment A, and the IP address of the user equipment B by means of query according to the user identity of the user equipment A, and the user identity of the user equipment B.

Figure 8:
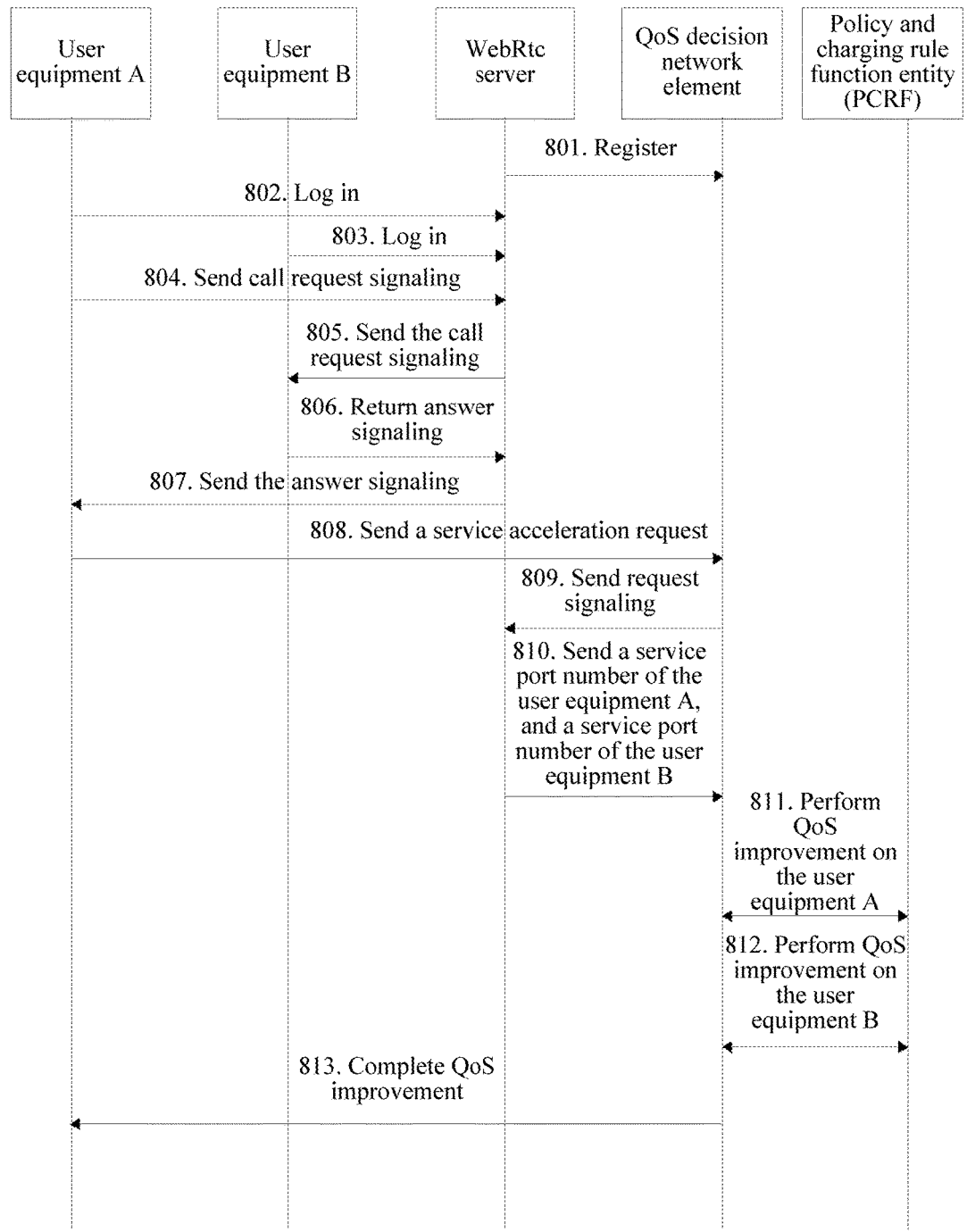
FIG. 8 is a schematic flowchart of a QoS improvement method according to Embodiment 7 of the present invention.

FIG. 8 is a schematic flowchart of a QoS improvement method according to Embodiment 7 of the present invention. This embodiment is a specific embodiment of Embodiment 5 of the present invention and Embodiment 6 of the present invention. In this embodiment, a WebRtc server acquires a service port number of user equipment A, and a service port number of user equipment B, and sends the service port number of the user equipment A, and the service port number of the user equipment B to a QoS decision network element, so as to perform QoS improvement in combination with an IP address of the user equipment A, and an IP address of the user equipment B that are sent by a mobile network element and received by the QoS decision network element.

As shown in FIG. 8, the QoS improvement method in this embodiment includes the following steps:

For step 801 to step 807, reference may be made to step 401 to step 407 in Embodiment 3 of the present invention.

Step 808: The user equipment A initiates a service acceleration request to the QoS decision network element, and invokes an acceleration API of the QoS decision network element.

Specifically, the service acceleration request includes the user identity of the user equipment A, and the user identity of the user equipment B.

Specifically, when the user equipment A and the user equipment B are attached, the QoS decision network element receives the user identity and the IP address of the user equipment A, and the user identity and the IP address of the user equipment B that are from the mobile network; therefore, in this step, after receiving the service acceleration request, the QoS decision network element queries the IP address of the user equipment A, and the IP address of the user equipment B according to the user identity of the user equipment A, and the user identity of the user equipment B that are in the service acceleration request.

Step 809: The QoS decision network element sends request signaling to the WebRtc server, and requests to acquire the service port number of the user equipment A, and the service port number of the user equipment B, where the request signaling includes the IP address of the user equipment A, and the IP address of the user equipment B. Step 810: The WebRtc server sends the service port number of the user equipment A, and the service port number of the user equipment B to the QoS decision network element.

Specifically, the WebRtc server queries the service port number of the user equipment A, and the service port number of the user equipment B according to the IP address of the user equipment A, and the IP address of the user equipment B that are sent by the QoS decision network element, and sends the service port number of the user equipment A, and the service port number of the user equipment B to the QoS decision network element.

For step 811 to step 813, reference may be made to step 411 to step 413 in Embodiment 3 of the present invention.

Therefore, based on the QoS improvement method in this embodiment of the present invention, a WebRtc server acquires a service port number of user equipment A, and a service port number of user equipment B, and sends the service port number of the user equipment A, and the service port number of the user equipment B to a QoS decision network element, so as to perform QoS improvement in combination with an IP address of the user equipment A and an IP address of the user equipment B that are sent by a mobile network element and received by the QoS decision network element, so that a manner in which the user equipment A collects and connects the IP addresses and the service port numbers of the both parties in the prior art is changed, which lightens burden on the user equipment A, reduces difficulty in using the current QoS improvement method by a user, and improves user friendliness.

It should be understood that, the sequence numbers of the foregoing steps do not mean the execution sequence, and the execution sequence of the steps should be determined according to functions and internal logic of the steps, but should not constitute any limitation to the implementation processes in the embodiments of the present invention.

The foregoing describes the QoS methods according to the embodiments of the present invention in detail with reference to FIG. 1 to FIG. 8, and the following describes QoS improvement apparatuses and systems according to embodiments of the present invention.

Figure 9:
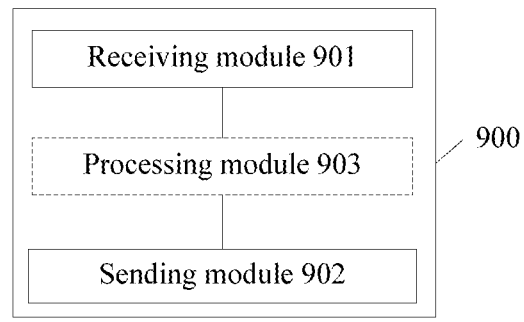
FIG. 9 is a schematic block diagram of a QoS improvement apparatus according to Embodiment 8 of the present invention.

FIG. 9 is a schematic block diagram of a QoS improvement apparatus 900 according to Embodiment 8 of the present invention. The QoS improvement apparatus may be a WebRtc server, but this embodiment of the present invention is not limited thereto. As shown in FIG. 9, the QoS improvement apparatus provided in this embodiment of the present invention includes:

a receiving module 901, configured to receive an IP address and a service port number of user equipment A, and an IP address and a service port number of user equipment B; and a sending module 902, configured to send the IP address and the service port number of the user equipment A, and the IP address and the service port number of the user equipment B to a QoS decision network element, so that the QoS decision network element forms a parameter according to the IP address and the service port number of the user equipment A, and the IP address and the service port number of the user equipment B, and sends a QoS improvement request to a PCRF.

Therefore, the QoS improvement apparatus in this embodiment of the present invention receives an IP address and a service port number of user equipment A, and an IP address and a service port number of user equipment B, and sends the IP address and the service port number of the user equipment A, and the IP address and the service port number of the user equipment B to a QoS decision network element, so that a manner in which the user equipment A collects and connects the IP addresses and the service port numbers of the both parties in the prior art is changed, which lightens burden on the user equipment A, and reduces difficulty in using the current QoS improvement method by a user.

The receiving module 901 is specifically configured to receive call request signaling sent by the user equipment A to the user equipment B, where the call request signaling includes the IP address and the service port number of the user equipment A, and acquire the IP address and the service port number of the user equipment A from the call request signaling; the sending module 902 is further configured to send the call request signaling to the user equipment B; and the receiving module 901 is specifically configured to receive answer signaling returned by the user equipment B to the user equipment A, where the answer signaling includes the IP address and the service port number of the user equipment B, and acquire the IP address and the service port number of the user equipment B from the answer signaling.

Optionally, the apparatus includes a processing module 903, where the processing module is configured to: after the receiving module receives the IP address and the service port number of the user equipment A, and the IP address and the service port number of the user equipment B, bind the received IP address and service port number of the user equipment A, and the received IP address and service port number of the user equipment B to a user identity of the user equipment A corresponding to the received IP address and service port number of the user equipment A, and a user identity of the user equipment B corresponding to the received IP address and service port number of the user equipment B respectively; the receiving module 901 is further configured to receive request signaling sent by the QoS decision network element, and request to acquire the IP addresses and the service port numbers of the both parties of the user equipments, where the request signaling includes the user identities of the both parties of the user equipments;

and the sending module 902 being configured to send the IP address and the service port number of the user equipment A, and the IP address and the service port number of the user equipment B to a QoS decision network element is specifically: sending, according to the user identity of the user equipment A, and the user identity of the user equipment B that are in the request signaling, the IP address and the service port number of the user equipment A, and the IP address and the service port number of the user equipment B that correspond to the user identities to the QoS decision network element.

Optionally, as another embodiment, the sending module 902 is specifically configured to: after the receiving module 901 receives the call request signaling sent by the user equipment A to the user equipment B, send the IP address and the service port number of the user equipment A to the QoS decision network element; and after the receiving module 901 receives the answer signaling returned by the user equipment B to the user equipment A, send the IP address and the service port number of the user equipment B to the QoS decision network element.

Optionally, as another embodiment, the sending module 902 is specifically configured to: after the receiving module 901 receives the answer signaling returned by the user equipment B to the user equipment A, send the IP address and the service port number of the user equipment A, and the IP address and the service port number of the user equipment B to the QoS decision network element.

Operations and/or functions of the modules in the QoS improvement apparatus provided in Embodiment 8 of the present invention are separately used to implement corresponding processes in the methods in FIG. 2, FIG. 4, and FIG. 5, and details are not described herein again for brevity.

Figure 10:
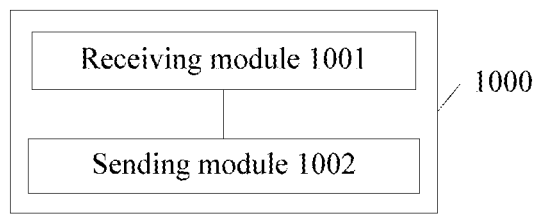
FIG. 10 is a schematic block diagram of a QoS improvement apparatus according to Embodiment 9 of the present invention.

FIG. 10 is a schematic block diagram of another QoS improvement apparatus woo according to Embodiment 9 of the present invention. The QoS improvement apparatus may be a QoS decision network element, but this embodiment of the present invention is not limited thereto. Optionally, the QoS improvement apparatus provided in this embodiment may be combined with the QoS improvement apparatus provided in Embodiment 8 of the present invention.

As shown in FIG. 10, the QoS improvement apparatus provided in this embodiment may include:

a receiving module 1001, configured to receive an IP address and a service port number of user equipment A, and an IP address and a service port number of user equipment B that are sent by a WebRtc server; and receive a service acceleration request sent by the user equipment A, and request to perform QoS improvement on a service between the user equipment A and the user equipment B; and a sending module 1002, configured to form a parameter according to the IP address and the service port number of the user equipment A, and the IP address and the service port number of the user equipment B, and send a QoS improvement request to a policy and charging rule function entity PCRF.

Therefore, the QoS improvement apparatus in this embodiment of the present invention receives an IP address and a service port number of user equipment A, and an IP address and a service port number of user equipment B that are sent by a WebRtc server, so that a manner in which the user equipment A collects and connects the IP addresses and the service port numbers of the both parties in the prior art is changed, which lightens burden on the user equipment A, and reduces difficulty in using the current QoS improvement method by a user.

Optionally, the service acceleration request includes a user identity of the user equipment A, and a user identity of the user equipment B, and the sending module 1002 is further configured to send request signaling to the WebRtc server, and request to acquire the IP address and the service port number of the user equipment A, and the IP address and the service port number of the user equipment B, where the request signaling includes the user identity of the user equipment A, and the user identity of the user equipment B; the receiving module 1001 being configured to receive an IP address and a service port number of user equipment A, and an IP address and a service port number of user equipment B that are sent by a WebRtc server specifically includes: the receiving module 1001 being configured to receive the IP address and the service port number of the user equipment A, and the IP address and the service port number of the user equipment B that are returned by the WebRtc server according to the user identity of the user equipment A, and the user identity of the user equipment B.

Optionally, as another embodiment, the receiving module 1001 is further configured to: when the user equipments are attached, receive user identities of the user equipments that are sent by a mobile network element; a processing module is configured to bind the IP address and the service port number of the user equipment A, and the IP address and the service port number of the user equipment B to the user identity of the user equipment A, and the user identity of the user equipment B respectively; and the receiving module 1001 being configured to receive a service acceleration request sent by the user equipment A, and the sending module 1002 being configured to form a parameter according to the IP address and the service port number of the user equipment A, and the IP address and the service port number of the user equipment B, and send a QoS improvement request to a PCRF include: the receiving module 1001 being configured to receive a service acceleration request sent by the user equipment A, where the service acceleration request includes the user identity of the user equipment A, and the user identity of the user equipment B; and the sending module 1002 being configured to obtain the IP address and the service port number of the user equipment A, and the IP address and the service port number of the user equipment B by means of query according to the user identity of the user equipment A, and the user identity of the user equipment B, form a parameter and send a QoS improvement request to the PCRF.

Operations and/or functions of the modules in the QoS improvement apparatus provided in Embodiment 9 of the present invention are separately used to implement corresponding processes in the methods in FIG. 3, FIG. 4, and FIG. 5, and details are not described herein again for brevity.

Figure 11:
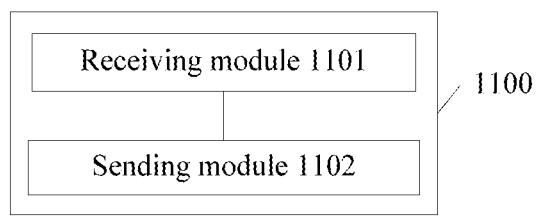
FIG. 11 is a schematic block diagram of a QoS improvement apparatus according to Embodiment 10 of the present invention.

FIG. 11 is a schematic block diagram of another QoS improvement apparatus according to Embodiment 10 of the present invention. The QoS improvement apparatus may be a WebRtc server, but this embodiment of the present invention is not limited thereto. As shown in FIG. 11, the QoS improvement apparatus provided in this embodiment of the present invention includes:

a receiving module 1101, configured to receive an IP address and a service port number of user equipment A, and an IP address and a service port number of user equipment B; and receive request signaling from a QoS decision network element, and request to acquire the service port number of the user equipment A, and the service port number of the user equipment B, where the request signaling includes the IP address of the user equipment A, and the IP address of the user equipment B; and a sending module 1102, configured to: acquire the service port number of the user equipment A and the service port number of the user equipment B according to the IP address of the user equipment A and the IP address of the user equipment B, and send the service port number of the user equipment A and the service port number of the user equipment B to the QoS decision network element, so that the QoS decision network element forms a parameter according to the IP address and the service port number of the user equipment A, and the IP address and the service port number of the user equipment B, and sends a QoS improvement request to a PCRF.

Specifically, the receiving module 1101 is specifically configured to receive call request signaling sent by the user equipment A to the user equipment B, where the call request signaling includes the IP address and the service port number of the user equipment A, and acquire the IP address and the service port number of the user equipment A from the call request signaling; and receive answer signaling returned by the user equipment B to the user equipment A, where the answer signaling includes the IP address and the service port number of the user equipment B, and acquire the IP address and the service port number of the user equipment B from the answer signaling; and the sending module 1102 is further configured to: after the receiving module 1101 receives the call request signaling sent by the user equipment A to the user equipment B, send the call request signaling to the user equipment B.

Therefore, the QoS improvement apparatus in this embodiment of the present invention receives a service port number of user equipment A, and a service port number of user equipment B, and sends the service port number of the user equipment A, and the service port number of the user equipment B to a QoS decision network element, so as to perform QoS improvement in combination with an IP address of the user equipment A and an IP address of the user equipment B that are in the QoS decision network element, so that a manner in which the user equipment A collects and connects the IP addresses and the service port numbers of the both parties in the prior art is changed, which lightens burden on the user equipment A, reduces difficulty in using the current QoS improvement method by a user, and improves user friendliness.

Operations and/or functions of the modules in the QoS improvement apparatus provided in Embodiment 10 of the present invention are separately used to implement corresponding processes in the methods in FIG. 6, and FIG. 8, and details are not described herein again for brevity.

Figure 12:
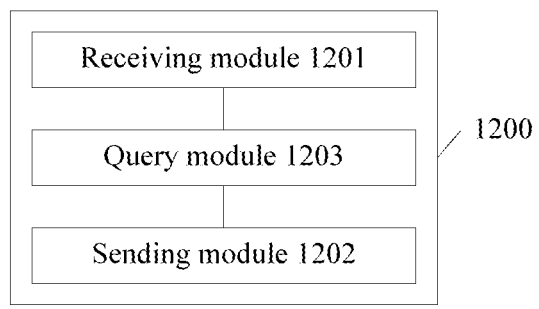
FIG. 12 is a schematic block diagram of a QoS improvement apparatus according to Embodiment 11 of the present invention.

FIG. 12 is a schematic block diagram of a QoS improvement apparatus according to Embodiment n of the present invention. The QoS improvement apparatus may be a QoS decision network element, but this embodiment of the present invention is not limited thereto. Optionally, for the QoS improvement apparatus provided in this embodiment and the QoS improvement apparatus provided in Embodiment 10 of the present invention, reference may be made to each other.

As shown in FIG. 12, the QoS improvement apparatus provided in this embodiment includes:

a receiving module 1201, configured to receive an IP address of user equipment A, and an IP address of user equipment B that are sent by a mobile network; receive a service acceleration request sent by the user equipment A; and receive a service port number of the user equipment A, and a service port number of the user equipment B that are sent by a WebRtc server; and a sending module 1202, configured to send request signaling to the WebRtc server, and request to acquire the service port number of the user equipment A, and the service port number of the user equipment B, where the request signaling includes the IP address of the user equipment A, and the IP address of the user equipment B; and form a parameter according to the IP address and the service port number of the user equipment A, and the IP address and the service port number of the user equipment B, and send a QoS improvement request to a PCRF.

Specifically, the receiving module 1201 being configured to receive an IP address of user equipment A, and an IP address of user equipment B that are sent by a mobile network includes: the receiving module 1201 being configured to: when the user equipment A is attached, receive the IP address and a user identity of the user equipment A that are sent by the mobile network; and when the user equipment B is attached, receive the IP address and a user identity of the user equipment B that are sent by the mobile network; and when the service acceleration request sent by the user equipment A that the receiving module 1201 is configured to receive includes the user identity of the user equipment A, and the user identity of the user equipment B, before the sending module 1202 is configured to send the request signaling to the WebRtc server, the apparatus further includes: a query module 1203, configured to obtain the IP address of the user equipment A, and the IP address of the user equipment B by means of query according to the user identity of the user equipment A, and the user identity of the user equipment B.

Therefore, the QoS improvement apparatus in this embodiment of the present invention receives an IP address of user equipment A, and an IP address of user equipment B that are sent by a mobile network, so as to perform QoS improvement in combination with a service port number of the user equipment A, and a service port number of the user equipment B that are sent by a WebRtc server, so that a manner in which the user equipment A collects and connects the IP addresses and the service port numbers of the both parties in the prior art is changed, which lightens burden on the user equipment A, reduces difficulty in using the current QoS improvement method by a user, and improves user friendliness.

Operations and/or functions of the modules in the QoS improvement apparatus provided in Embodiment n of the present invention are separately used to implement corresponding processes in the methods in FIG. 7, and FIG. 8, and details are not described herein again for brevity.

Figure 13:
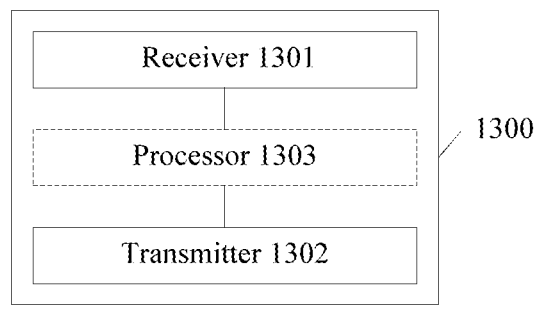
FIG. 13 is a schematic block diagram of a QoS improvement apparatus according to Embodiment 12 of the present invention.

FIG. 13 is a schematic block diagram of a QoS improvement apparatus according to Embodiment 12 of the present invention. The QoS improvement apparatus may be a WebRtc server, but this embodiment of the present invention is not limited thereto. As shown in FIG. 13, the QoS improvement apparatus provided in this embodiment includes:

a receiver 1301, configured to receive an IP address and a service port number of user equipment A, and an IP address and a service port number of user equipment B; and a transmitter 1302, configured to send the IP address and the service port number of the user equipment A, and the IP address and the service port number of the user equipment B to a QoS decision network element, so that the QoS decision network element forms a parameter according to the IP address and the service port number of the user equipment A, and the IP address and the service port number of the user equipment B, and sends a QoS improvement request to a PCRF.

Therefore, the QoS improvement apparatus in this embodiment of the present invention receives an IP address and a service port number of user equipment A, and an IP address and a service port number of user equipment B, and sends the IP address and the service port number of the user equipment A, and the IP address and the service port number of the user equipment B to a QoS decision network element, so that a manner in which the user equipment A collects and connects the IP addresses and the service port numbers of the both parties in the prior art is changed, which lightens burden on the user equipment A, reduces difficulty in using the current QoS improvement method by a user, and improves user friendliness.

The receiver 1301 is specifically configured to receive call request signaling sent by the user equipment A to the user equipment B, where the call request signaling includes the IP address and the service port number of the user equipment A, and acquire the IP address and the service port number of the user equipment A from the call request signaling; the transmitter 1302 is further configured to send the call request signaling to the user equipment B; and the receiver 1301 is specifically configured to receive answer signaling returned by the user equipment B to the user equipment A, where the answer signaling includes the IP address and the service port number of the user equipment B, and acquire the IP address and the service port number of the user equipment B from the answer signaling.

Optionally, the apparatus includes a processor 1303, where the processor 1303 is configured to: after the receiving module receives the IP address and the service port number of the user equipment A, and the IP address and the service port number of the user equipment B, bind the received IP address and service port number of the user equipment A, and the received IP address and service port number of the user equipment B to a user identity of the user equipment A corresponding to the received IP address and service port number of the user equipment A, and a user identity of the user equipment B corresponding to the received IP address and service port number of the user equipment B respectively; the receiver 1301 is further configured to receive request signaling sent by the QoS decision network element, and request to acquire the IP addresses and the service port numbers of the both parties of the user equipments, where the request signaling includes the user identities of the both parties of the user equipments; and the transmitter 1302 being configured to send the IP address and the service port number of the user equipment A, and the IP address and the service port number of the user equipment B to a QoS decision network element is specifically: sending, according to the user identity of the user equipment A, and the user identity of the user equipment B that are in the request signaling, the IP address and the service port number of the user equipment A, and the IP address and the service port number of the user equipment B that correspond to the user identities to the QoS decision network element.

Optionally, as another embodiment, the transmitter 1302 is specifically configured to: after the receiver 1301 receives the call request signaling sent by the user equipment A to the user equipment B, send the IP address and the service port number of the user equipment A to the QoS decision network element; and after the receiver 1301 receives the answer signaling returned by the user equipment B to the user equipment A, send the IP address and the service port number of the user equipment B to the QoS decision network element.

Optionally, as another embodiment, the transmitter 1302 is specifically configured to: after the receiver 1301 receives the answer signaling returned by the user equipment B to the user equipment A, send the IP address and the service port number of the user equipment A, and the IP address and the service port number of the user equipment B to the QoS decision network element.

Operations and/or functions of the modules in the QoS improvement apparatus provided in Embodiment 12 of the present invention are separately used to implement corresponding processes in the methods in FIG. 2, FIG. 4, and FIG. 5, and details are not described herein again for brevity.

It should be understood that, the apparatus provided in Embodiment 12 of the present invention may be a central processing unit (Central Processing Unit, "CPU" for short), and may also be another general purpose processor, a digital signal processor (DSP), an application specific integrated circuit (ASIC), a field programmable gate array (FPGA) or another programmable logic device, a discrete gate or a transistor logic device, a discrete hardware component, or the like. The general purpose processor may be a microprocessor or the processor may also be any conventional processor.

In an implementation process, the foregoing steps may be completed by using an integrated logic circuit of hardware or an instruction in a software form in the apparatus provided in Embodiment 12 of the present invention, and in combination with the steps of the methods disclosed in the embodiments of the present invention, may be directly embodied as being performed and completed by a hardware processor, or performed and completed by using a combination of hardware and software modules in a processor. The software module may be located in a storage medium that is mature in the art, such as a random access memory, a flash memory, a read-only memory, a programmable read-only memory or an electrically erasable programmable memory, or a register. The storage medium is located in a memory. The apparatus provided in Embodiment 12 of the present invention reads information in a memory, and completes the steps of the foregoing methods in combination with hardware of the apparatus. Details are not described herein again to avoid repetition.

Figure 14:
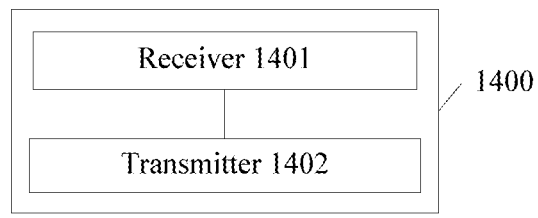
FIG. 14 is a schematic block diagram of a QoS improvement apparatus according to Embodiment 13 of the present invention.

FIG. 14 is a schematic block diagram of another QoS improvement apparatus according to Embodiment 13 of the present invention. The QoS improvement apparatus may be a QoS decision network element, but this embodiment of the present invention is not limited thereto. Optionally, for the QoS improvement apparatus provided in this embodiment and the QoS improvement apparatus provided in Embodiment 12 of the present invention, reference may be made to each other.

As shown in FIG. 14, the QoS improvement apparatus provided in this embodiment may include:

a receiver 1401, configured to receive an IP address and a service port number of user equipment A, and an IP address and a service port number of user equipment B that are sent by a WebRtc server; and receive a service acceleration request sent by the user equipment A; and a transmitter 1402, configured to receive an IP address and a service port number of user equipment A, and an IP address and a service port number of user equipment B that are sent by a WebRtc server; and receive a service acceleration request sent by the user equipment A.

Therefore, the QoS improvement apparatus provided in this embodiment of the present invention receives an IP address and a service port number of user equipment A, and an IP address and a service port number of user equipment B that are sent by a WebRtc server, so that a manner in which the user equipment A collects and connects the IP addresses and the service port numbers of the both parties in the prior art is changed, which lightens burden on the user equipment A, reduces difficulty in using the current QoS improvement method by a user, and improves user friendliness.

Optionally, the service acceleration request includes a user identity of the user equipment A, and a user identity of the user equipment B, and the transmitter 1402 is further configured to send request signaling to the WebRtc server, and request to acquire the IP address and the service port number of the user equipment A, and the IP address and the service port number of the user equipment B, where the request signaling includes the user identity of the user equipment A, and the user identity of the user equipment B; the receiver 1401 being configured to receive an IP address and a service port number of user equipment A, and an IP address and a service port number of user equipment B that are sent by a WebRtc server specifically includes: the receiver 1401 being configured to receive the IP address and the service port number of the user equipment A, and the IP address and the service port number of the user equipment B that are returned by the WebRtc server according to the user identity of the user equipment A, and the user identity of the user equipment B.

Optionally, as another embodiment, the receiver 1401 is further configured to: when the user equipments are attached, receive user identities of the user equipments that are sent by a mobile network element; a processor is configured to bind the IP address and the service port number of the user equipment A, and the IP address and the service port number of the user equipment B to the user identity of the user equipment A, and the user identity of the user equipment B respectively; and the receiver 1401 being configured to receive a service acceleration request sent by the user equipment A, and the transmitter 1402 being configured to form a parameter according to the IP address and the service port number of the user equipment A, and the IP address and the service port number of the user equipment B, and send a QoS improvement request to a PCRF include: the receiver 1401 being configured to receive a service acceleration request sent by the user equipment A, where the service acceleration request includes the user identity of the user equipment A, and the user identity of the user equipment B; and the transmitter 1402 being configured to obtain the IP address and the service port number of the user equipment A, and the IP address and the service port number of the user equipment B by means of query according to the user identity of the user equipment A, and the user identity of the user equipment B, form a parameter and send a QoS improvement request to the PCRF.

Operations and/or functions of the modules in the QoS improvement apparatus provided in Embodiment 13 of the present invention are separately used to implement corresponding processes in the methods in FIG. 3, FIG. 4, and FIG. 5, and details are not described herein again for brevity.

It should be understood that, the apparatus provided in Embodiment 13 of the present invention may be a central processing unit (Central Processing Unit, "CPU" for short), and may also be another general purpose processor, a digital signal processor (DSP), an application specific integrated circuit (ASIC), a field programmable gate array (FPGA) or another programmable logic device, a discrete gate or a transistor logic device, a discrete hardware component, or the like. The general purpose processor may be a microprocessor or the processor may also be any conventional processor.

In an implementation process, the foregoing steps may be completed by using an integrated logic circuit of hardware or an instruction in a software form in the apparatus provided in Embodiment 13 of the present invention, and in combination with the steps of the methods disclosed in the embodiments of the present invention, may be directly embodied as being performed and completed by a hardware processor, or performed and completed by using a combination of hardware and software modules in a processor. The software module may be located in a storage medium that is mature in the art, such as a random access memory, a flash memory, a read-only memory, a programmable read-only memory or an electrically erasable programmable memory, or a register. The storage medium is located in a memory. The apparatus provided in Embodiment 13 of the present invention reads information in a memory, and completes the steps of the foregoing methods in combination with hardware of the apparatus. Details are not described herein again to avoid repetition.

Figure 15:
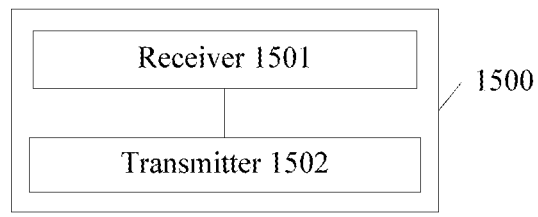
FIG. 15 is a schematic block diagram of a QoS improvement apparatus according to Embodiment 14 of the present invention.

FIG. 15 is a schematic block diagram of another QoS improvement apparatus according to Embodiment 14 of the present invention. The QoS improvement apparatus may be a WebRtc server, but this embodiment of the present invention is not limited thereto. As shown in FIG. 15, the QoS improvement apparatus provided in this embodiment of the present invention includes:

a receiver 1501, configured to receive an IP address and a service port number of user equipment A, and an IP address and a service port number of user equipment B; and receive request signaling from a QoS decision network element, and request to acquire the service port number of the user equipment A, and the service port number of the user equipment B, where the request signaling includes the IP address of the user equipment A, and the IP address of the user equipment B; and a transmitter 1502, configured to: acquire the service port number of the user equipment A and the service port number of the user equipment B according to the IP address of the user equipment A and the IP address of the user equipment B, and send the service port number of the user equipment A and the service port number of the user equipment B to the QoS decision network element, so that the QoS decision network element forms a parameter according to the IP address and the service port number of the user equipment A, and the IP address and the service port number of the user equipment B, and sends a QoS improvement request to a PCRF.

Specifically, the receiver 1501 is specifically configured to receive call request signaling sent by the user equipment A to the user equipment B, where the call request signaling includes the IP address and the service port number of the user equipment A, and acquire the IP address and the service port number of the user equipment A from the call request signaling; and receive answer signaling returned by the user equipment B to the user equipment A, where the answer signaling includes the IP address and the service port number of the user equipment B, and acquire the IP address and the service port number of the user equipment B from the answer signaling; and the transmitter 1502 is further configured to: after the receiving module 1101 receives the call request signaling sent by the user equipment A to the user equipment B, send the call request signaling to the user equipment B.

Therefore, the QoS improvement apparatus in this embodiment of the present invention acquires a service port number of user equipment A, and a service port number of user equipment B, and sends the service port number of the user equipment A, and the service port number of the user equipment B to a QoS decision network element, so as to perform QoS improvement in combination with an IP address of the user equipment A and an IP address of the user equipment B that are in the QoS decision network element, so that a manner in which the user equipment A collects and connects the IP addresses and the service port numbers of the both parties in the prior art is changed, which lightens burden on the user equipment A, and reduces difficulty in using the current QoS improvement method by a user.

Operations and/or functions of the modules in the QoS improvement apparatus provided in Embodiment 14 of the present invention are separately used to implement corresponding processes in the methods in FIG. 6, and FIG. 8, and details are not described herein again for brevity.

It should be understood that, the apparatus provided in Embodiment 14 of the present invention may be a central processing unit (Central Processing Unit, "CPU" for short), and may also be another general purpose processor, a digital signal processor (DSP), an application specific integrated circuit (ASIC), a field programmable gate array (FPGA) or another programmable logic device, a discrete gate or a transistor logic device, a discrete hardware component, or the like. The general purpose processor may be a microprocessor or the processor may also be any conventional processor.

In an implementation process, the foregoing steps may be completed by using an integrated logic circuit of hardware or an instruction in a software form in the apparatus provided in Embodiment 14 of the present invention, and in combination with the steps of the methods disclosed in the embodiments of the present invention, may be directly embodied as being performed and completed by a hardware processor, or performed and completed by using a combination of hardware and software modules in a processor. The software module may be located in a storage medium that is mature in the art, such as a random access memory, a flash memory, a read-only memory, a programmable read-only memory or an electrically erasable programmable memory, or a register. The storage medium is located in a memory. The apparatus provided in Embodiment 14 of the present invention reads information in a memory, and completes the steps of the foregoing methods in combination with hardware of the apparatus. Details are not described herein again to avoid repetition.

Figure 16:
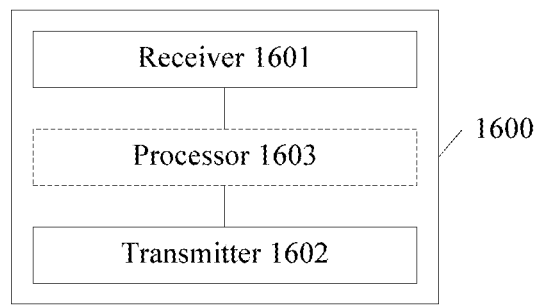
FIG. 16 is a schematic block diagram of a QoS improvement apparatus according to Embodiment 15 of the present invention.

FIG. 16 is a schematic block diagram of a QoS improvement apparatus according to Embodiment 15 of the present invention. The QoS improvement apparatus may be a QoS decision network element, but this embodiment of the present invention is not limited thereto. Optionally, for the QoS improvement apparatus provided in this embodiment and the QoS improvement apparatus provided in Embodiment 14 of the present invention, reference may be made to each other.

As shown in FIG. 16, the QoS improvement apparatus provided in this embodiment includes:

a receiver 1601, configured to receive an IP address of user equipment A, and an IP address of user equipment B that are sent by a mobile network; receive a service acceleration request sent by the user equipment A; and receive a service port number of the user equipment A, and a service port number of the user equipment B that are sent by a WebRtc server; and a transmitter 1602, configured to send request signaling to the WebRtc server, and request to acquire the service port number of the user equipment A, and the service port number of the user equipment B, where the request signaling includes the IP address of the user equipment A, and the IP address of the user equipment B; and form a parameter according to the IP address and the service port number of the user equipment A, and the IP address and the service port number of the user equipment B, and send a QoS improvement request to a PCRF.

Specifically, the receiver 1601 being configured to receive an IP address of user equipment A, and an IP address of user equipment B that are sent by a mobile network includes: the receiver 1601 being configured to: when the user equipment A is attached, receive the IP address and a user identity of the user equipment A that are sent by the mobile network; and when the user equipment B is attached, receive the IP address and a user identity of the user equipment B that are sent by the mobile network; and when the service acceleration request sent by the user equipment A that the receiver 1601 is configured to receive includes the user identity of the user equipment A, and the user identity of the user equipment B, before the transmitter 1602 is configured to send the request signaling to the WebRtc server, the apparatus further includes: a processor 1603, configured to obtain the IP address of the user equipment A, and the IP address of the user equipment B by means of query according to the user identity of the user equipment A, and the user identity of the user equipment B.

Therefore, the QoS improvement apparatus in this embodiment of the present invention receives an IP address of user equipment A, and an IP address of user equipment B that are sent by a mobile network, so as to perform QoS improvement in combination with a service port number of the user equipment A, and a service port number of the user equipment B that are sent by a WebRtc server, so that a manner in which the user equipment A collects and connects the IP addresses and the service port numbers of the both parties in the prior art is changed, which lightens burden on the user equipment A, and reduces difficulty in using the current QoS improvement method by a user.

Operations and/or functions of the modules in the QoS improvement apparatus provided in Embodiment 15 of the present invention are separately used to implement corresponding processes in the methods in FIG. 7, and FIG. 8, and details are not described herein again for brevity.

It should be understood that, the apparatus provided in Embodiment 15 of the present invention may be a central processing unit (Central Processing Unit, "CPU" for short), and may also be another general purpose processor, a digital signal processor (DSP), an application specific integrated circuit (ASIC), a field programmable gate array (FPGA) or another programmable logic device, a discrete gate or a transistor logic device, a discrete hardware component, or the like. The general purpose processor may be a microprocessor or the processor may also be any conventional processor.

In an implementation process, the foregoing steps may be completed by using an integrated logic circuit of hardware or an instruction in a software form in the apparatus provided in Embodiment 15 of the present invention, and in combination with the steps of the methods disclosed in the embodiments of the present invention, may be directly embodied as being performed and completed by a hardware processor, or performed and completed by using a combination of hardware and software modules in a processor. The software module may be located in a storage medium that is mature in the art, such as a random access memory, a flash memory, a read-only memory, a programmable read-only memory or an electrically erasable programmable memory, or a register. The storage medium is located in a memory. The apparatus provided in Embodiment 15 of the present invention reads information in a memory, and completes the steps of the foregoing methods in combination with hardware of the apparatus. Details are not described herein again to avoid repetition.

Figure 17:
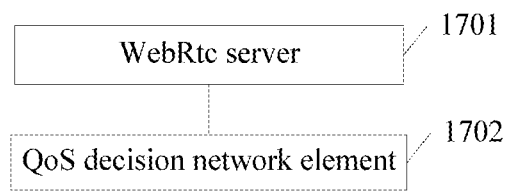
FIG. 17 is a schematic structural diagram of a QoS improvement system according to Embodiment 16 of the present invention.

FIG. 17 is a schematic structural diagram of a QoS improvement system according to Embodiment 16 of the present invention. The QoS improvement system may include a WebRtc server and a QoS decision network element, but this embodiment of the present invention is not limited thereto. As shown in FIG. 17, the QoS improvement system provided in this embodiment of the present invention includes:

the WebRtc server 1701, configured to receive an IP address and a service port number of user equipment A, and an IP address and a service port number of user equipment B; and send the IP address and the service port number of the user equipment A, and the IP address and the service port number of the user equipment B to the QoS decision network element; and the QoS decision network element 1702, configured to receive the IP address and the service port number of the user equipment A, and the IP address and the service port number of the user equipment B that are sent by the WebRtc server; receive a service acceleration request sent by the user equipment A; and form a parameter according to the IP address and the service port number of the user equipment A, and the IP address and the service port number of the user equipment B, and send a QoS improvement request to a PCRF.

The functions of the WebRtc servers in Embodiments 1, 3 and 4 of the present invention may be implemented by the WebRtc server 1701 in the QoS improvement system provided in this embodiment; and the functions of the QoS decision network elements in Embodiments 2, 3 and 4 of the present invention may be implemented by the QoS decision network element 1702 in the QoS improvement system provided in this embodiment.

Specifically, the WebRtc server 1701 is specifically configured to receive call request signaling sent by the user equipment A to the user equipment B, where the call request signaling includes the IP address and the service port number of the user equipment A, and acquire the IP address and the service port number of the user equipment A from the call request signaling; the WebRtc server 1701 is further configured to: after receiving the call request signaling sent by the user equipment A to the user equipment B, send the call request signaling to the user equipment B; and the WebRtc server 1701 is specifically configured to receive answer signaling returned by the user equipment B to the user equipment A, where the answer signaling includes the IP address and the service port number of the user equipment B, and acquire the IP address and the service port number of the user equipment B from the answer signaling.

Optionally, the WebRtc server 1701 is further configured to: after receiving the IP address and the service port number of the user equipment A, and the IP address and the service port number of the user equipment B, bind the received IP address and service port number of the user equipment A, and the received IP address and service port number of the user equipment B to a user identity of the user equipment A corresponding to the received IP address and service port number of the user equipment A, and a user identity of the user equipment B corresponding to the received IP address and service port number of the user equipment B respectively; the QoS decision network element 1702 is specifically configured to receive a service acceleration request sent by the user equipment A, where the service acceleration request includes the user identity of the user equipment A, and the user identity of the user equipment B; and send request signaling to the WebRtc server 1701, and request to acquire the IP address and the service port number of the user equipment A, and the IP address and the service port number of the user equipment B, where the request signaling includes the user identity of the user equipment A, and the user identity of the user equipment B; and the WebRtc server 1701 being configured to send the IP address and the service port number of the user equipment A, and the IP address and the service port number of the user equipment B to the QoS decision network element is specifically: the WebRtc server 1701 being configured to send, according to the user identity of the user equipment A, and the user identity of the user equipment B that are in the request signaling, the IP address and the service port number of the user equipment A, and the IP address and the service port number of the user equipment B that correspond to the user identities to the QoS decision network element 1702.

Optionally, the WebRtc server 1701 being configured to send the IP address and the service port number of the user equipment A, and the IP address and the service port number of the user equipment B to the QoS decision network element specifically includes: the WebRtc server 1701 being configured to: after receiving the call request signaling sent by the user equipment A to the user equipment B, send the IP address and the service port number of the user equipment A to the QoS decision network element 1702; and after receiving the answer signaling returned by the user equipment B to the user equipment A, send the IP address and the service port number of the user equipment B to the QoS decision network element.

Optionally, as another embodiment, the WebRtc server 1701 being configured to send the IP address and the service port number of the user equipment A, and the IP address and the service port number of the user equipment B to the QoS decision network element 1702 specifically includes: the WebRtc server 1701 being configured to: after receiving the answer signaling returned by the user equipment B to the user equipment A, send the IP address and the service port number of the user equipment A, and the IP address and the service port number of the user equipment B to the QoS decision network element 1702.

Specifically, the QoS decision network element 1702 is further configured to: when the user equipment A and the user equipment B are attached, receive a user identity of the user equipment A and a user identity of the user equipment B that are sent by a mobile network element; and after receiving the IP address and the service port number of the user equipment A, and the IP address and the service port number of the user equipment B that are sent by the WebRtc server 1701, bind the IP address and the service port number of the user equipment A, and the IP address and the service port number of the user equipment B to the user identity of the user equipment A, and the user identity of the user equipment B respectively; and the QoS decision network element 1702 being configured to receive a service acceleration request sent by the user equipment A; and form a parameter according to the IP address and the service port number of the user equipment A, and the IP address and the service port number of the user equipment B, and send a QoS improvement request to a PCRF includes: the QoS decision network element 1702 being configured to receive a service acceleration request sent by the user equipment A, where the service acceleration request includes the user identity of the user equipment A, and the user identity of the user equipment B; and configured to obtain the IP address and the service port number of the user equipment A, and the IP address and the service port number of the user equipment B by means of query according to the user identity of the user equipment A, and the user identity of the user equipment B, form a parameter and send a QoS improvement request to the PCRF.

Therefore, according to the QoS improvement system in this embodiment of the present invention, a WebRtc server acquires an IP address and a service port number of user equipment A, and an IP address and a service port number of user equipment B, and sends the IP address and the service port number of the user equipment A, and the IP address and the service port number of the user equipment B to a QoS decision network element, so that a manner in which the user equipment A collects and connects the IP addresses and the service port numbers of the both parties in the prior art is changed, which lightens burden on the user equipment A, and reduces difficulty in using the current QoS improvement method by a user.

Figure 18:
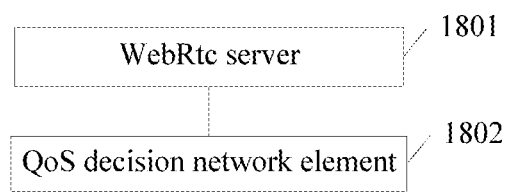
FIG. 18 is a schematic structural diagram of a QoS improvement system according to Embodiment 17 of the present invention.

FIG. 18 is a schematic structural diagram of a QoS improvement system according to Embodiment 17 of the present invention. The QoS improvement system may include a WebRtc server and a QoS decision network element, but this embodiment of the present invention is not limited thereto. As shown in FIG. 18, the QoS improvement system provided in this embodiment of the present invention includes:

the WebRtc server 1801, configured to receive an IP address and a service port number of user equipment A, and an IP address and a service port number of user equipment B; receive request signaling from the QoS decision network element, and request to acquire the service port number of the user equipment A, and the service port number of the user equipment B, where the request signaling includes the IP address of the user equipment A, and the IP address of the user equipment B; and acquire the service port number of the user equipment A, and the service port number of the user equipment B according to the IP address of the user equipment A, and the IP address of the user equipment B, and send the service port number of the user equipment A, and the service port number of the user equipment B to the QoS decision network element; and the QoS decision network element 1802, configured to receive the IP address of the user equipment A, and the IP address of the user equipment B that are sent by a mobile network; receive a service acceleration request sent by the user equipment A; send request signaling to the WebRtc server; receive the service port number of the user equipment A, and the service port number of the user equipment B that are sent by the WebRtc server; and form a parameter according to the IP address and the service port number of the user equipment A, and the IP address and the service port number of the user equipment B, and send a QoS improvement request to a PCRF.

Specifically, the WebRtc server 1801 is specifically configured to receive call request signaling sent by the user equipment A to the user equipment B, where the call request signaling includes the IP address and the service port number of the user equipment A, and acquire the IP address and the service port number of the user equipment A from the call request signaling; the WebRtc server 1801 is further configured to: after the receiving module receives the call request signaling sent by the user equipment A to the user equipment B, send the call request signaling to the user equipment B; and the WebRtc server 1801 is specifically configured to receive answer signaling returned by the user equipment B to the user equipment A, where the answer signaling includes the IP address and the service port number of the user equipment B, and acquire the IP address and the service port number of the user equipment B from the answer signaling.

Specifically, the QoS decision network element 1802 being configured to receive the IP address of the user equipment A, and the IP address of the user equipment B that are sent by a mobile network includes: the QoS decision network element 1802 being configured to: when the user equipment A is attached, receive the IP address and a user identity of the user equipment A that are sent by the mobile network; and when the user equipment B is attached, receive the IP address and a user identity of the user equipment B that are sent by the mobile network; and when the service acceleration request sent by the user equipment A that the QoS decision network element 1802 is configured to receive includes the user identity of the user equipment A, and the user identity of the user equipment B, before the QoS decision network element 1802 is configured to send the request signaling to the WebRtc server, the QoS decision network element 1802 being configured to receive the IP address of the user equipment A, and the IP address of the user equipment B that are sent by a mobile network further includes: the QoS decision network element 1802 being configured to obtain the IP address of the user equipment A, and the IP address of the user equipment B by means of query according to the user identity of the user equipment A, and the user identity of the user equipment B.

The functions of the WebRtc servers in Embodiments 5 and 7 of the present invention may be implemented by the WebRtc server 1801 in the QoS improvement system provided in this embodiment; and the functions of the QoS decision network elements in Embodiments 6 and 7 of the present invention may be implemented by the QoS decision network element 1802 in the QoS improvement system provided in this embodiment.

Therefore, according to the QoS improvement system in this embodiment of the present invention, a WebRtc server acquires a service port number of user equipment A, and a service port number of user equipment B, and sends the service port number of the user equipment A, and the service port number of the user equipment B to a QoS decision network element, so as to perform QoS improvement in combination with an IP address of the user equipment A and an IP address of the user equipment B that are in the QoS decision network element, so that a manner in which the user equipment A collects and connects the IP addresses and the service port numbers of the both parties in the prior art is changed, which lightens burden on the user equipment A.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A quality of service (QoS) improvement method, the method comprising:
   acquiring, by a web real-time communication (WebRtc) server, an IP address and a service port number of user equipment A, and an Internet Protocol (IP) address and a service port number of user equipment B; and
   sending, by the WebRtc server, the IP address and the service port number of the user equipment A, and the IP address and the service port number of the user equipment B to a QoS decision network element, so that the QoS decision network element forms a parameter according to the IP address and the service port number of the user equipment A, and the IP address and the service port number of the user equipment B, and sends a QoS improvement request to a policy and charging rule function entity (PCRF);
   wherein the WebRtc server provides a WebRtc service between user equipment A and user equipment B, after user equipment A and user equipment B have logged into the WebRtc service.

2. The method according to claim 1, wherein the acquiring, by a WebRtc server, an IP address and a service port number of user equipment A, and an IP address and a service port number of user equipment B comprises:
   receiving, by the WebRtc server, call request signaling sent by the user equipment A to the user equipment B, wherein the call request signaling comprises the IP address and the service port number of the user equipment A, and acquiring the IP address and the service port number of the user equipment A from the call request signaling;
   sending, by the WebRtc server, the call request signaling to the user equipment B; and
   receiving, by the WebRtc server, answer signaling returned by the user equipment B to the user equipment A, wherein the answer signaling comprises the IP address and the service port number of the user equipment B, and acquiring the IP address and the service port number of the user equipment B from the answer signaling.

3. The method according to claim 2, wherein the sending, by the WebRtc server, the IP address and the service port number of the user equipment A, and the IP address and the service port number of the user equipment B to a QoS decision network element specifically comprises:
   after the receiving, by the WebRtc server, call request signaling sent by the user equipment A to the user equipment B, sending, by the WebRtc server, the IP address and the service port number of the user equipment A to the QoS decision network element; and
   after the receiving, by the WebRtc server, answer signaling returned by the user equipment B to the user equipment A, sending, by the WebRtc server, the IP address and the service port number of the user equipment B to the QoS decision network element.

4. The method according to claim 2, wherein the sending, by the WebRtc server, the IP address and the service port number of the user equipment A, and the IP address and the service port number of the user equipment B to a QoS decision network element specifically comprises:
   after the receiving, by the WebRtc server, answer signaling returned by the user equipment B to the user equipment A, sending, by the WebRtc server, the IP address and the service port number of the user equipment A, and the IP address and the service port number of the user equipment B to the QoS decision network element.

5. The method according to claim 1, wherein after the acquiring, by a WebRtc server, an IP address and a service port number of user equipment A, and an IP address and a service port number of user equipment B, and before the sending the IP address and the service port number of the user equipment A, and the IP address and the service port number of the user equipment B to a QoS decision network element, the method further comprises:
   binding, by the WebRtc server, the IP address and the service port number of the user equipment A, and the IP address and the service port number of the user equipment B to a user identity of the user equipment A, and a user identity of the user equipment B respectively;
   receiving, by the WebRtc server, request signaling sent by the QoS decision network element, and requesting to acquire the IP address and the service port number of the user equipment A, and the IP address and the service port number of the user equipment B, wherein the request signaling comprises the user identity of the user equipment A, and the user identity of the user equipment B; and
   obtaining, by the WebRtc server, the IP address and the service port number of the user equipment A, and the IP address and the service port number of the user equipment B according to the user identity of the user equipment A, and the user identity of the user equipment B that are in the request signaling.

6. A quality of service (QoS) improvement method, the method comprising:
   acquiring, by a web real-time communication WebRtc server, an IP address and a service port number of user equipment A, and an Internet Protocol IP address and a service port number of user equipment B;
   receiving, by the WebRtc server, request signaling from a quality of service QoS decision network element, and requesting to acquire the service port number of the user equipment A and the service port number of the user equipment B, wherein the request signaling comprises the IP address of the user equipment A and the IP address of the user equipment B; and
   acquiring, by the WebRtc server, the service port number of the user equipment A and the service port number of the user equipment B according to the IP address of the user equipment A and the IP address of the user equipment B, and sending the service port number of the user equipment A and the service port number of the user equipment B to the QoS decision network element, so that the QoS decision network element forms a parameter according to the IP address and the service port number of the user equipment A, and the IP address and the service port number of the user equipment B, and sends a QoS improvement request to a PCRF;
   wherein the WebRtc server provides a WebRtc service between user equipment A and user equipment B, after user equipment A and user equipment B have logged into the WebRtc service.

7. The method according to claim 6, wherein the acquiring, by a WebRtc server, an IP address and a service port number of user equipment A, and an IP address and a service port number of user equipment B comprises:
   receiving, by the WebRtc server, call request signaling sent by the user equipment A to the user equipment B, wherein the call request signaling comprises the IP address and the service port number of the user equipment A, and acquiring the IP address and the service port number of the user equipment A from the call request signaling;
   sending, by the WebRtc server, the call request signaling to the user equipment B; and
   receiving, by the WebRtc server, answer signaling returned by the user equipment B to the user equipment A, wherein the answer signaling comprises the IP address and the service port number of the user equipment B, and acquiring the IP address and the service port number of the user equipment B from the answer signaling.

8. A quality of service (QoS) improvement method, the method comprising:
   receiving, by a quality of service QoS decision network element, an IP address and a service port number of user equipment A, and an IP address and a service port number of user equipment B that are sent by a web real-time communication WebRtc server, wherein the WebRtc server provides a WebRtc service between user equipment A and user equipment B, after user equipment A and user equipment B have logged into the WebRtc service;
   receiving, by the QoS decision network element, a service acceleration request sent by the user equipment A, and requesting to perform QoS improvement on a service between the user equipment A and the user equipment B; and
   forming, by the QoS decision network element, a parameter according to the IP address and the service port number of the user equipment A, and the IP address and the service port number of the user equipment B, and sending a QoS improvement request to a policy and charging rule function entity PCRF.

9. The method according to claim 8, wherein the service acceleration request comprises a user identity of the user equipment A, and a user identity of the user equipment B, and the method further comprises:
   sending, by the QoS decision network element, request signaling to the WebRtc server, and requesting to acquire the IP address and the service port number of the user equipment A, and the IP address and the service port number of the user equipment B, wherein the request signaling comprises the user identity of the user equipment A, and the user identity of the user equipment B; and
   the receiving, by a QoS decision network element, an IP address and a service port number of user equipment A, and an IP address and a service port number of user equipment B that are sent by a WebRtc server specifically comprises:
   receiving, by the QoS decision network element, the IP address and the service port number of the user equipment A, and the IP address and the service port number of the user equipment B that are returned by the WebRtc server according to the user identity of the user equipment A, and the user identity of the user equipment B.

10. The method according to claim 8, wherein the method further comprises: when the user equipment A and the user equipment B are attached, acquiring, by the QoS decision network element, a user identity of the user equipment A and a user identity of the user equipment B that are sent by a mobile network;

after the receiving, by a QoS decision network element, an IP address and a service port number of user equipment A, and an IP address and a service port number of user equipment B that are sent by a WebRtc server, the method further comprises: binding, by the QoS decision network element, the IP address and the service port number of the user equipment A, and the IP address and the service port number of the user equipment B to the user identity of the user equipment A, and the user identity of the user equipment B respectively; and the receiving, by the QoS decision network element, a service acceleration request sent by the user equipment A, and the forming, by the QoS decision network element, a parameter according to the IP address and the service port number of the user equipment A, and the IP address and the service port number of the user equipment B, and sending a QoS improvement request to a PCRF comprise:

receiving, by the QoS decision network element, a service acceleration request sent by the user equipment A, wherein the service acceleration request comprises the user identity of the user equipment A, and the user identity of the user equipment B; and obtaining, by the QoS decision network element, the IP address and the service port number of the user equipment A, and the IP address and the service port number of the user equipment B by using query according to the user identity of the user equipment A, and the user identity of the user equipment B, forming a parameter and sending a QoS improvement request to the PCRF.

11. A quality of service (QoS) improvement method, the method comprising:

receiving, by a quality of service QoS decision network element, an IP address of user equipment A, and an IP address of user equipment B that are sent by a mobile network;

receiving, by the QoS decision network element, a service acceleration request sent by the user equipment A, and requesting to perform QoS improvement on a service between the user equipment A and the user equipment B;

sending, by the QoS decision network element, request signaling to a web real-time communication WebRtc server, and requesting to acquire a service port number of the user equipment A, and a service port number of the user equipment B, wherein the request signaling comprises the IP address of the user equipment A, and the IP address of the user equipment B;

receiving, by the QoS decision network element, the service port number of the user equipment A, and the service port number of the user equipment B that are sent by the WebRtc server, wherein the WebRtc server provides a WebRtc service between user equipment A and user equipment B, after user equipment A and user equipment B have logged into the WebRtc service; and forming, by the QoS decision network element, a parameter according to the IP address and the service port number of the user equipment A, and the IP address and the service port number of the user equipment B, and sending a QoS improvement request to a PCRF.

12. The method according to claim 11, wherein the receiving, by a QoS decision network element, an IP address of user equipment A, and an IP address of user equipment B that are sent by a mobile network specifically comprises: when the user equipment A is attached, receiving, by the QoS decision network element, the IP address and a user identity of the user equipment A that are sent by the mobile network, and when the user equipment B is attached, receiving the IP address and a user identity of the user equipment B that are sent by the mobile network; and when the service acceleration request that is sent by the user equipment A and received by the QoS decision network element comprises the user identity of the user equipment A, and the user identity of the user equipment B, before the sending, by the QoS decision network element, request signaling to a WebRtc server, the method further comprises:

obtaining, by the QoS decision network element, the IP address of the user equipment A, and the IP address of the user equipment B by using query according to the user identity of the user equipment A, and the user identity of the user equipment B.

* * * * *